(12) United States Patent  
Kawashima

(10) Patent No.: US 6,496,815 B1
(45) Date of Patent: Dec. 17, 2002

(54) NEURON, HIERARCHICAL NEURAL NETWORK USING THE NEURON, AND MULTIPLYING CIRCUIT USED FOR MULTIPLYING PROCESS IN THE NEURON

(75) Inventor: Takeshi Kawashima, Seto (JP)

(73) Assignees: Denso Corporation, Kariya (JP); Nagoya Industrial Science Research Institute, Nagoya (JP)

( * ) Notice: Subject to any disclaimer, the term of this patent is extended or adjusted under 35 U.S.C. 154(b) by 0 days.

(21) Appl. No.: 09/577,353

(22) Filed: May 24, 2000

(30) Foreign Application Priority Data

May 27, 1999 (JP) .......................... 11-148067
Nov. 18, 1999 (JP) .......................... 11-328312

(51) Int. Cl.$^7$ ................................. G06N 3/06
(52) U.S. Cl. ......................... 706/35; 332/106
(58) Field of Search .................. 706/35, 15, 16; 332/106

(56) References Cited

U.S. PATENT DOCUMENTS

| | | | |
|---|---|---|---|
| 5,324,991 A | 6/1994 | Furuta et al. ................... | 706/41 |
| 5,327,522 A | * 7/1994 | Furuta et al. ................... | 706/43 |
| 5,630,023 A | 5/1997 | Oteki .......................... | 706/41 |

FOREIGN PATENT DOCUMENTS

| | | |
|---|---|---|
| JP | 3-180962 | 8/1991 |
| JP | 3-218559 | 9/1991 |

OTHER PUBLICATIONS

*Dynamical Data Coding in Brain*, Computer Today, No. 82, pp. 41–51, Nov. 1997.

* cited by examiner

*Primary Examiner*—Thomas Black
*Assistant Examiner*—Joseph P. Hirl
(74) *Attorney, Agent, or Firm*—Law Offices of David G. Posz

(57) ABSTRACT

There is provided a neuron which is capable of expressing an excitative coupling and a suppressive coupling by one signal by devising signals processed in the neuron to reduce a circuit area of a neural network in constructing the neural network by a digital electronic circuit. A multiplying block calculates a numerical value following a normal distribution N(wx, 1) by using a corresponding link weight w under the supposition that delay time of each pulse of an input signal follows a normal distribution of N(x, 1). Next, an adding block adds the numerical values calculated by the respective multiplying blocks one after another and a non-linear operating block counts a number of positive values within the added value obtained by the adding block. A pulse delaying block delays output pulse following a normal distribution in which delay time is 0 in average generated by a basic pulse generating block based on the result of operation of the non-linear operating block to output as an output signal.

15 Claims, 27 Drawing Sheets

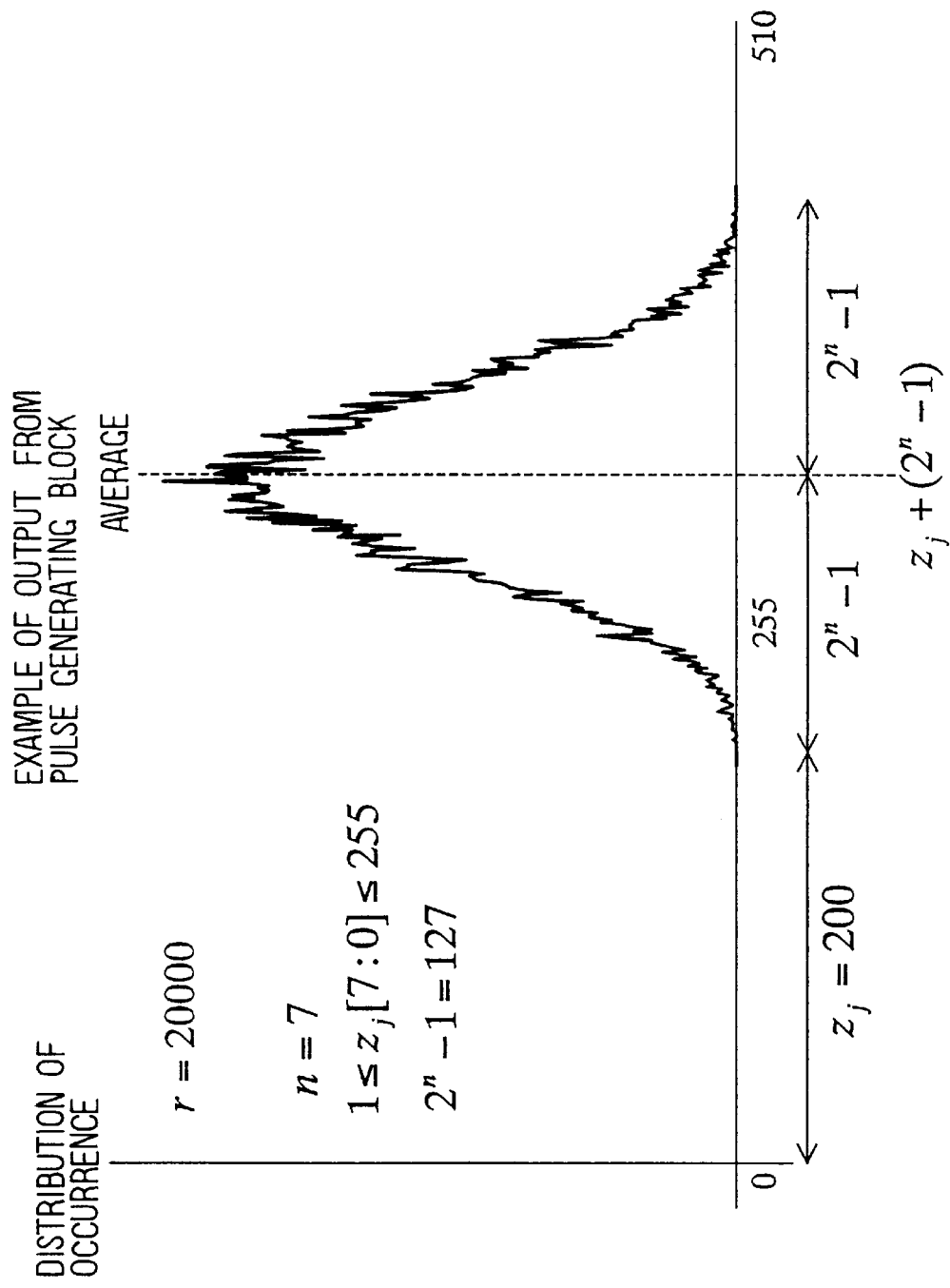

NEURON, HIERARCHICAL NEURAL NETWORK USING THE NEURON, AND MULTIPLYING CIRCUIT USED FOR MULTIPLYING PROCESS IN THE NEURON

CROSS REFERENCE TO RELATED APPLICATION

This application is based upon Japanese Patent Application Nos. Hei. 11-148067 filed on May 27, 1999, and Hei. 11-328312 filed on Nov. 18, 1999, the contents of which are incorporated herein by reference.

BACKGROUND OF THE INVENTION

1. Field of the Invention

This invention relates to signal processing apparatuses, and particular to a signal processing apparatus such as a neural computer applied in character and graphic recognition, associated storage, multi-input/output non-linear mapping and the like.

2. Related Art

Hitherto, there has been known a neural network (neural cell circuit network) modeled after information processing carried out in a living body. In the neural network, a neuron is a unit of function and information processing is carried out by disposing a plurality of neurons in network. Such neural network is suitable for information processing of character and graphic recognition, associated storage, multi-input/output non-linear mapping and the like which can be hardly achieved by the conventional Neumann type computers.

Next, the neural network will be explained to facilitate understanding of the present invention.

At first, the schematic structure of the neural network will be explained.

The neural network is configured by disposing neurons in network as described above as shown in FIG. 15 for example.

The neural network shown in FIG. 15 is called as a three-layered hierarchical neural network and comprises an input layer, an intermediate layer (hidden layer) and an output layer.

It is noted that a signal is inputted from the input layer and is outputted from the output layer as it propagates sequentially through the intermediate layer and the output layer. The input layer only propagates the input signal to the intermediate layer and carries out no arithmetic operation like the intermediate layer and the output layer as is known in the technological field. Therefore, the functional unit composing the intermediate and output layers is referred to as a neuron. The intermediate and output layers contain at least one neuron, respectively.

The input layer is coupled with the respective neurons of the intermediate layer and the respective neurons of the intermediate layer are coupled with the respective neurons of the output layer as shown in FIG. 15. Then, the signal inputted to the input layer of the neural network is propagated to the intermediate layer to undergo predetermined arithmetic operations within the neurons contained in the intermediate layer as described later. Its output value is propagated further to the output layer. Similar arithmetic operations are carried also in the neurons contained in the output layer and its output value becomes the final output of the network.

This series of operations is the information processing of the neural network called a sequential propagation (forward processing) and allows input/output to be realized arbitrarily when a sufficient number of neurons are contained in the intermediate layer.

It is noted that although the neural network shown in FIG. 15 is a three-layered structure network having one intermediate layer, there has been proposed a network having two or more intermediate layers.

The neuron which is the structural unit of the neural network will be explained next.

FIG. 16 is a diagrammatic view of the j-th neuron denoted by a symbol j in FIG. 15. The neuron is composed of an input section for inputting input values from the outside, a computing section for computing those input values and an output section for outputting the result of computation.

When each input value from the outside is expressed as $x_i$ (i=1, 2, 3, . . . , n), the computing section multiplies a corresponding link weight $w_{ji}$ (i=1, 2, 3, . . . , n) with each input value $x_i$ and calculates their sum $y_j$ as shown by the following expression (1):

$$y_j = \Sigma w_{ji} x_i \qquad (1)$$

It is noted that the symbol $\Sigma$ is a symbol of sum of i. The link weight $w_{ji}$ indicates the strength of coupling between the neurons. The $w_{ji}$ indicates the link weight between the j-th neuron and the i-th neuron.

The computing section executes a non-linear computation f to the sum $y_j$ found as described above to output an output value $z_j$ as expressed by the following expression (2):

$$z_j = f(y_j) \qquad (2)$$

A Sigmoid function is often used as the non-linear function f because it expresses a differential value f' of the non-linear function f which is required in realizing a learning function described next by using the non-linear function f itself like $f'=f \cdot (1-f)$ and allows an amount of computation to be reduced. A step function is used as the non-linear function f in some cases. However, the non-linear function is not limited to those functions and may be a monotonous increment function having a saturating characteristic.

The neural network having such neurons as the structural unit is characterized in that it has the learning function. This learning function will be explained next.

The learning in the neural network is realized by updating the link weight of each neuron described above. That is, it enables to obtain a desired output signal z from the output layer when the value of link weight w is updated sequentially to an adequate value and a set of input signals (input pattern) p is given to the input layer.

In executing learning, a desired output signal t corresponding to the input signal p is given together with the input signal p. This output signal t is referred to as a teacher signal. A learning method called back propagation (BP) algorithm is used in the hierarchical neural network shown in FIG. 15.

The back propagation (BP) will be explained concretely.

When a certain input signal p is given, a square error of an output value $z_k$ of the neuron of the k-th output layer and a teacher signal value $t_k$ is defined by the following expression:

$$E_k = (t_k - z_k)^2 / 2 \qquad (3)$$

In the learning, the degree of all link weights is updated so as to reduce this square error $E_k$.

When the link weight $W_{kj}$ of the j-th neuron in the intermediate layer and the k-th neuron in the output layer is updated, the square error $E_k$ varies as follows:

$$\partial E_k/\partial w_{kj} = -(t_k - z_k) \cdot f'(y_k) \cdot z_j \quad (4)$$

Here, $z_j$ is an output of the j-th neuron of the intermediate layer and f' is differential of non-linear function of the neuron. $Y_k$ is an input sum expressed by the expression (1) described above about the k-th neuron of the output layer.

When the link weight $w_{ji}$ of the i-th neuron in the input layer and the j-th neuron in the intermediate layer is updated, the square error $E_k$ varies as follows:

$$\partial E_k/\partial w_{ji} = -\{\Sigma(t_k - z_k) \cdot f'(y_k) \cdot w_{kj}\} \cdot f'(y_j) \cdot z_i \quad (5)$$

Here, the symbol $\Sigma$ is a symbol of sum about k. $z_i$ is an output of the i-th neuron of the input layer and $y_j$ is an input sum expressed by the expression (1) described above about the j-th neuron of the intermediate layer.

Accordingly, the amounts of update $\Delta w_{kj}$ and $\Delta w_{ji}$ of the link weights for reducing the square error may be expressed by the following expressions:

$$\Delta w_{kj} = w_{kj}(t+1) - w_{kj}(t) = -\eta \cdot \partial E_k/\partial w_{kj} \quad (6)$$

$$\Delta w_{ji} = w_{ji}(t+1) - w_{ji}(t) = -\eta \cdot \partial E_k/\partial w_{ji} \quad (7)$$

It is noted that t indicates time here. The $\eta$ is a positive number called an update weight and is normally determined experimentally in a range of 0.1 to 0.5.

While the outline of the neural network has been explained above in detail, how to realize the function of the neuron described above is questioned in configuring the neural network.

Hitherto, the method of realizing the function of neuron by processing in software by using the Neumann type computer has been used often. However, the original parallel information processing is not carried out in this case because a CPU executes processes in the plurality of neurons in a time division manner.

Therefore, there has been proposed a technology for configuring neurons by using hardware. The method for realizing it by using hardware is divided roughly into two methods of using an analog circuit and of using a digital circuit.

The use of the analog circuit is advantageous in that the integration of neural network may be increased and signal processing speed may be increased because the area of the neuron may be reduced. However, because it expresses a value of each signal by scale of analog such as potential and current and each arithmetic operation is executed by analog elements such as an amplifier, variation due to temperature characteristics and variation of processes in forming elements are questioned. As a result, it has had disadvantages that the response characteristics of each element cannot be unified and no desired output value can be obtained.

Meanwhile, when the neuron is constructed by using the digital circuit, although it has had a disadvantage that the integration of the neural network cannot be increased because the area of the neuron is large as compared to that of the analog circuit, it has had advantages that its reliability is high because it is not affected by the variation of the temperature characteristics and of the processes in forming the element and the circuit may be relatively readily formed.

As the technology for constructing the neuron by using the digital circuit, there has been one disclosed in Japanese Patent Laid-Open No. Hei. 7-114524. In this technology, a concept of pulse density has been adopted in realizing the function of the neuron by the digital circuit. However, there has been the following problem when the pulse density is used.

That is, while there are excitative and suppressive couplings in the coupling between the neurons of the neural network and they are expressed by the positive and negative reference marks of the coupling function mathematically, they cannot be distinguished when the pulse density is used. That is, although the technology in Japanese Patent Laid-Open No. Hei. 7-114524 is arranged so as to be able to express "0 to 1" by the pulse density, it is necessary to express signals corresponding to "−1 to 1" in order to express the coupling between the neurons of the neural network. Therefore, this technology divides the respective couplings into two groups of excitative coupling and suppressive coupling by the plus and minus of the link weight. As a result, two systems of signal lines from a synapse circuit to nerve cell circuit defined in Japanese Patent Laid-Open No. Hei. 7-114524 are required.

SUMMARY OF THE INVENTION

The present invention has been devised to solve the above-mentioned problems and its object is to reduce a circuit area of a neural network.

Its second object is to contribute to the reduction of circuit area of a neural network by enabling the excitative and suppressive couplings to be expressed by one signal by adopting a concept of pulse delay time, not the pulse density, for a signal processed by the neurons in digitally configuring the neural network.

According to the present invention, a neuron is a structural unit of a hierarchical neural network realized as a digital electronic circuit. This neuron is modeled after a neuron of a living body.

A pulse train composed of a predetermined number of pulses is inputted to the neuron from the outside as an input signal. A delay time of each pulse with in this pulse train follows a normal distribution of average x. The delay time of each pulse is a delay time from a corresponding reference pulse within a reference pulse train.

FIG. 2 shows a pulse train $x_1$ as an input signal (input 1) for example. The pulse train $x_1$ is composed of m (predetermined number) pulses $s_1^1, s_1^{12}, \ldots s_1^m$. Then, the delay time $d_1^1, d_1^2$ and $d_1^m$ of each pulse to the reference pulses $T^1, T^2, \ldots, T^m$ within the reference pulse train follow the normal distribution of average $x_1$.

It is noted that the "delay time" here may take a minus value. For instance, $d_1^k(k=1, 2, 3, \ldots, m)$ takes a minus value when a pulse $s_1^k$ of the pulse train $x_1$ precedes the corresponding reference pulse $T^k$.

Although this reference pulse is considered to have intervals of fixed time, the reference pulse needs not to have intervals of fixed time. Although it is possible to arrange so that the reference pulse is generated on the outside of this neuron and is inputted to the neuron, the neuron may be provided with reference pulse generating means to generate the reference pulse within the neuron.

It is noted that the "pulse delay time" simply mentioned in the following explanation refers to the delay time from the corresponding reference pulse as described above.

When a pulse train as the input signal having such characteristics is inputted, the neuron of the present invention operates as follows.

At first, multiplication corresponding value calculating means finds a multiplication corresponding value following the normal distribution of average wx by using link weights w corresponding respectively to pulse trains as the input signal. Then, adding means adds the multiplication corresponding values found by the multiplication corresponding value calculating means with respect to each of the pulse trains. Here, the adding means adds them by taking out—multiplication corresponding values from a set of each multiplication corresponding value so that they do not overlap. For instance, if the multiplication corresponding value can be found in time series manner by the multiplication corresponding value calculating means, the adding means adds values of the same string in the multiplication corresponding value string in the time series.

Accordingly, when m pulse trains are inputted as an input signal and those pulse trains are what the delay time of each pulse follows the normal distribution of the average $x_i$ (i=1, 2, 3, ..., m: the same applies hereinafter), the distribution of the added values of the adding means follows the normal distribution of the average $\Sigma w_i x_i$, where $w_i$ is the link weight corresponding to each pulse train.

The arithmetic operation of the multiplication corresponding value calculating means and the adding means corresponds to the arithmetic operation shown in the expression (1).

Non-linear operating means counts a number of positive values within the added values obtained by the adding means. The positive value here may or may not include "0". That is, whether to include the boundary value "0" is barely influential from the point of view of the whole counted value. This number is what the probability density of the normal distribution of the average $\Sigma w_i x_i$ is integrated about the part whose added value (computed value of the delay time of each pulse) becomes a positive value. Accordingly, it causes non-linearity. The arithmetic operation by means of this non-linear arithmetic operating means corresponds to the operation shown in the expression (2).

Then, pulse train generating means generates a pulse train composed of a predetermined number of pulses. The delay time of each pulse of this pulse train follows the normal distribution wherein the delay time determined based on the number of positive values counted by the non-linear arithmetic operating means is an average value.

According to the invention, it is needless to say that the use of the digital circuit is advantageous in that it allows complete parallel processing to be achieved, a circuit to be formed relatively easily without being influenced by temperature characteristics and by the variation of processes in forming devices and allows a high reliability to be obtained.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

FIG. 31 is an example of outputs of the pulse generating block of the second embodiment.

DESCRIPTION OF THE PREFERRED EMBODIMENTS

Embodiments of the present invention will be explained below with reference to the drawings. It is noted that the invention is not limited to the following embodiments and may take various modes within the technological scope of the invention.

First Embodiment

Figure 1:
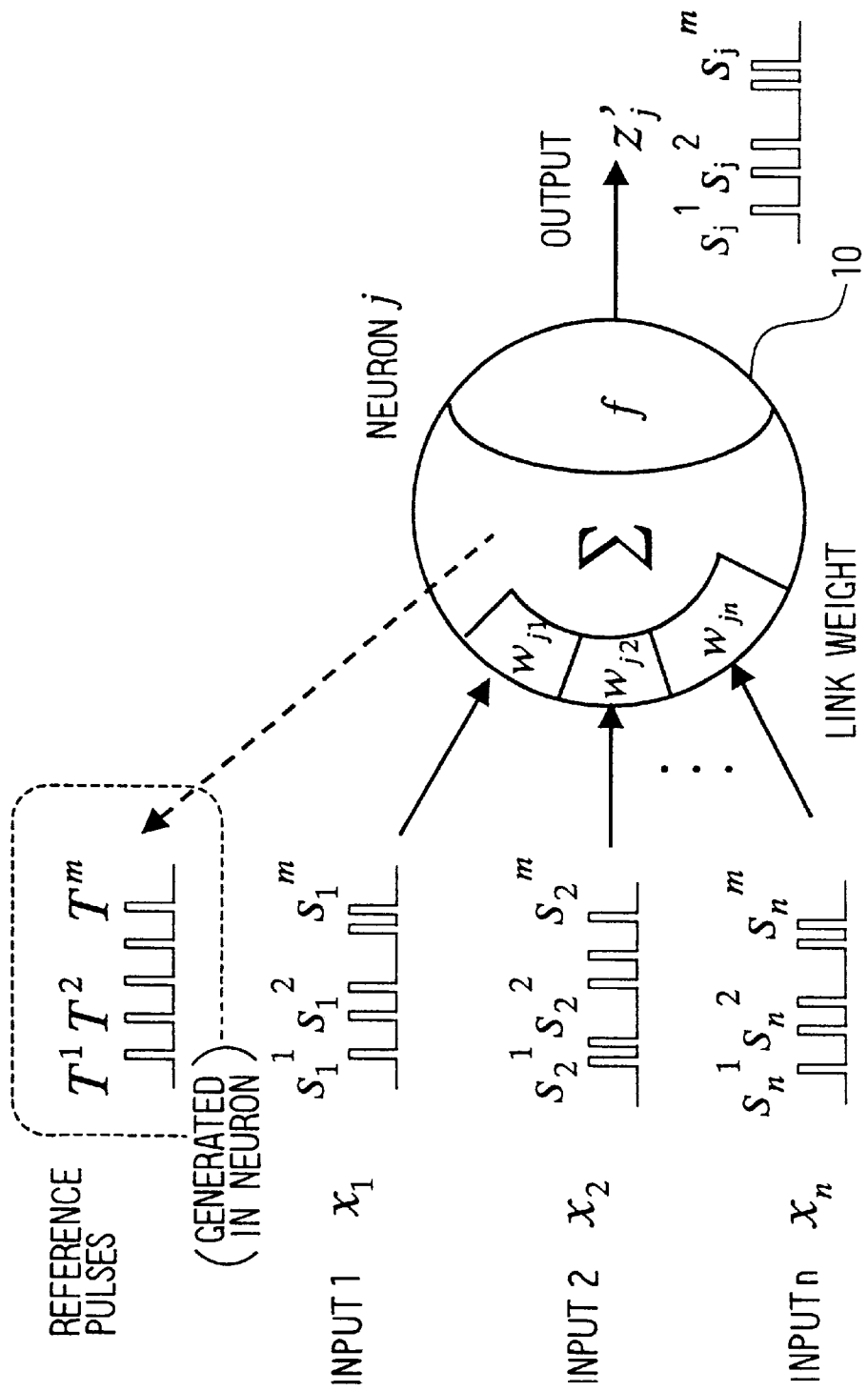
FIG. 1 is a schematic view illustrating a neuron of a first embodiment according to the present invention.

FIG. 1 is a diagrammatic view of a neuron which is a function unit of a hierarchical neural network.

Figure 15:
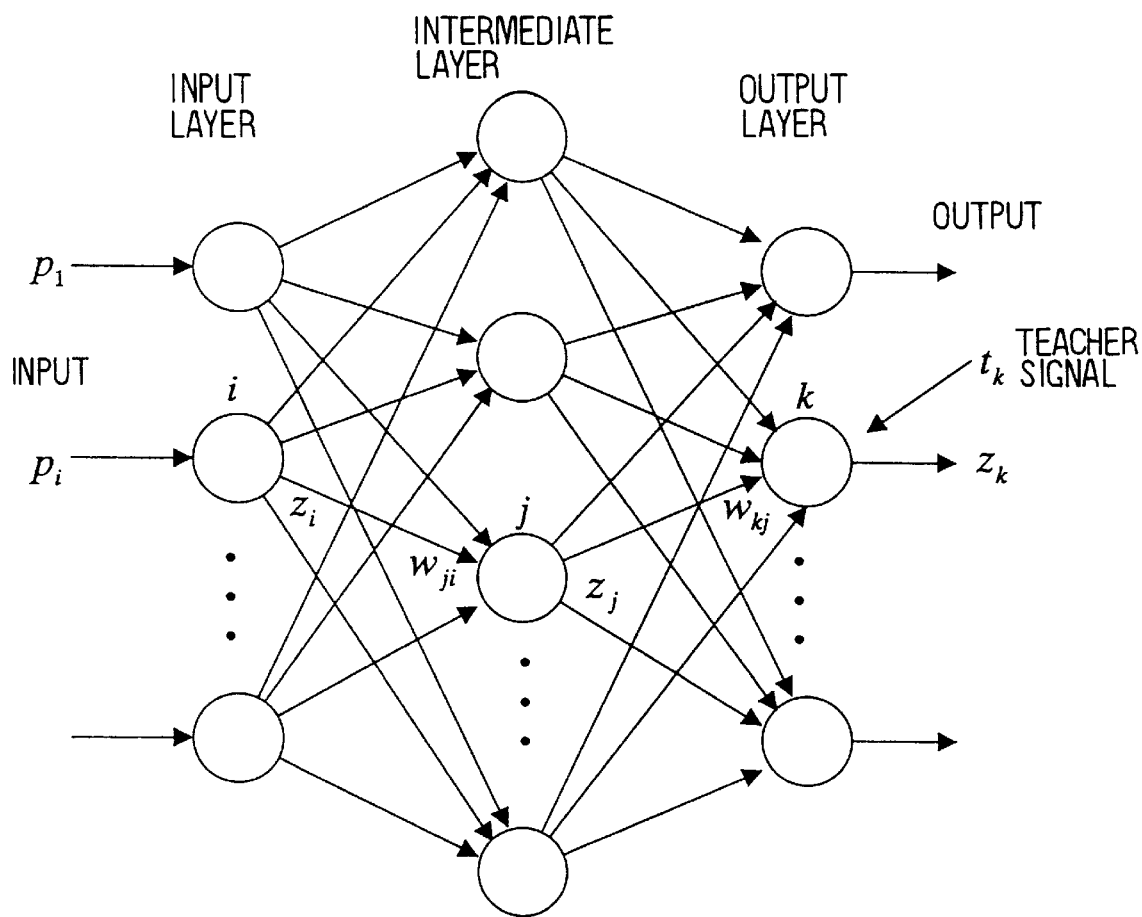
FIG. 15 is a diagram illustrating a layered hierarchical neural network.
Figure 16:
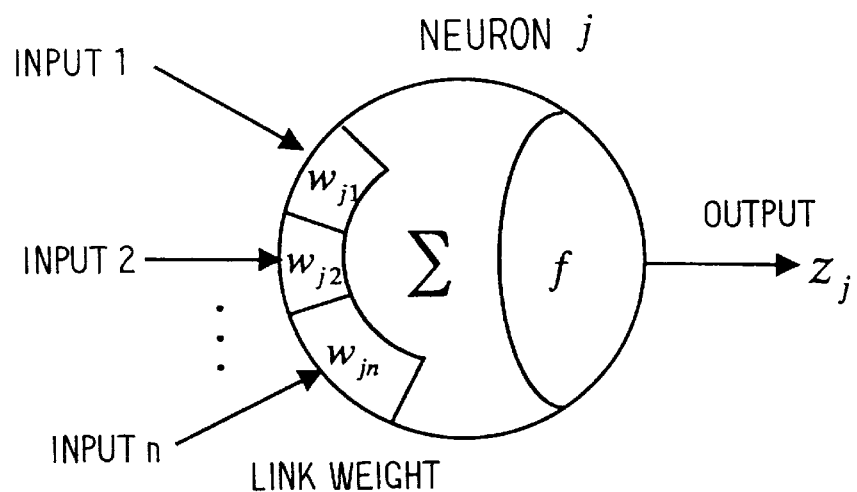
FIG. 16 is a diagram illustrating a normal neural network.

The neuron 10 is what the j-th neuron of the hierarchical neural network diagrammatically shown in FIG. 15 is illustrated.

As shown in FIG. 15, the neuron 10 inputs a signal (hereinafter referred to as an "input signal") from the input layer of the neural network, carries out predetermined arithmetic operations and outputs a signal (hereinafter referred to as an "output signal") to a neuron of an output layer. It is noted that all of the neurons contained in the intermediate layer and the output layer have the same structure. The neuron contained in the output layer carries out arithmetic operations based on the input signal from the neuron in the intermediate layer and generates the output signal of the neural network.

As shown in FIG. 1, n pulse trains $x_1, x_2, \ldots, x_n$ are inputted as input signals to the neuron 10. The neuron 10 outputs the pulse train $z_j'$ as the output signal. Each of the pulse trains $x_1$ through $x_n$, $z_j$ is composed of m pulses $s^1, s^2, s^3, \ldots, s^m$.

The neuron 10 is characterized in that it generates reference pulses of fixed time intervals and carries out signal processing based on delay time from the reference pulses $T^1, T^2, \ldots, T^m$ within thereof.

Figure 2:
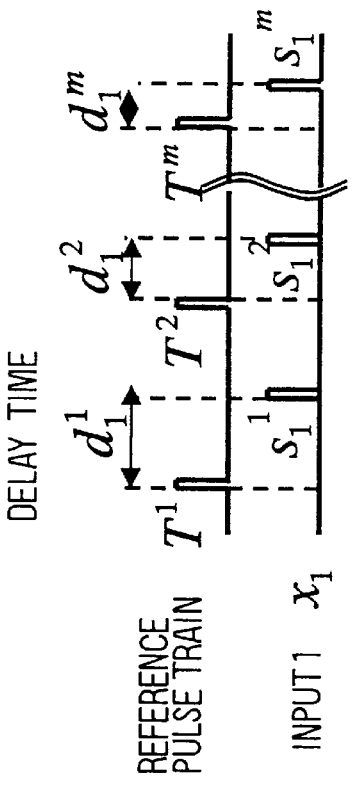
FIG. 2 is a diagram illustrating a delay time.

The delay time will be explained here. FIG. 2 shows the delay time of the m pulses $s_1^1$ thorough $s_1^m$ of the input signal $x_1$ for example. The delay time is the delay from the corresponding reference pulses $T^1$ through $T^m$ of the m respective pulse $s_1^1$ through $s_1^m$. As shown in FIG. 2, the delay time of the respective pulses $S_1^1$ through $s_1^m$ is represented as $d_1^1$ through $d_1^m$. It is noted that when the pulse $s_1^1$ of the input signal $x_1$ precedes the reference pulse $T^1$ for example, this delay time $d_1^1$ is handled as a minus value.

Because the neuron 10 of the present embodiment carries out the signal processing based on this delay time, the average of the delay times $d_i^1$ through $d_i^m$ of the pulse train inputted to the input signal $x_i$ (i=1, 2, 3, . . . , n) described above is represented as $x_i$ by using the same symbol with the symbol representing the input signal. At this time, the delay times $d_1^1$ through $d_1^m$ follow the normal distribution of $N(x_i, 1)$. Similarly to that, when the average of the delay times $d_j^1$ through $d_j^m$ of the pulse train of the output signal $z_j'$ is represented as $z_j$, the delay times $d_j^1$ through $d_m^1$ follow the normal distribution of $N(z_j, 1)$.

As shown in FIG. 1, the neuron 10 stores link weights $wj_{j1}, wj_{j2}, \ldots, w_{jn}$ corresponding to the respective ones of the pulse trains $x_1$ through $x_n$. Then, it carries out the arithmetic operations corresponding to the expressions 1 and 2 described in the explanation of the prior art to the input signal $x_i$. Then, it outputs the output signal $z_j'$, a pulse train, based on the result of operation of the expression (2).

Next, the structure and operation of the neuron 10 will be explained.

Figure 3:
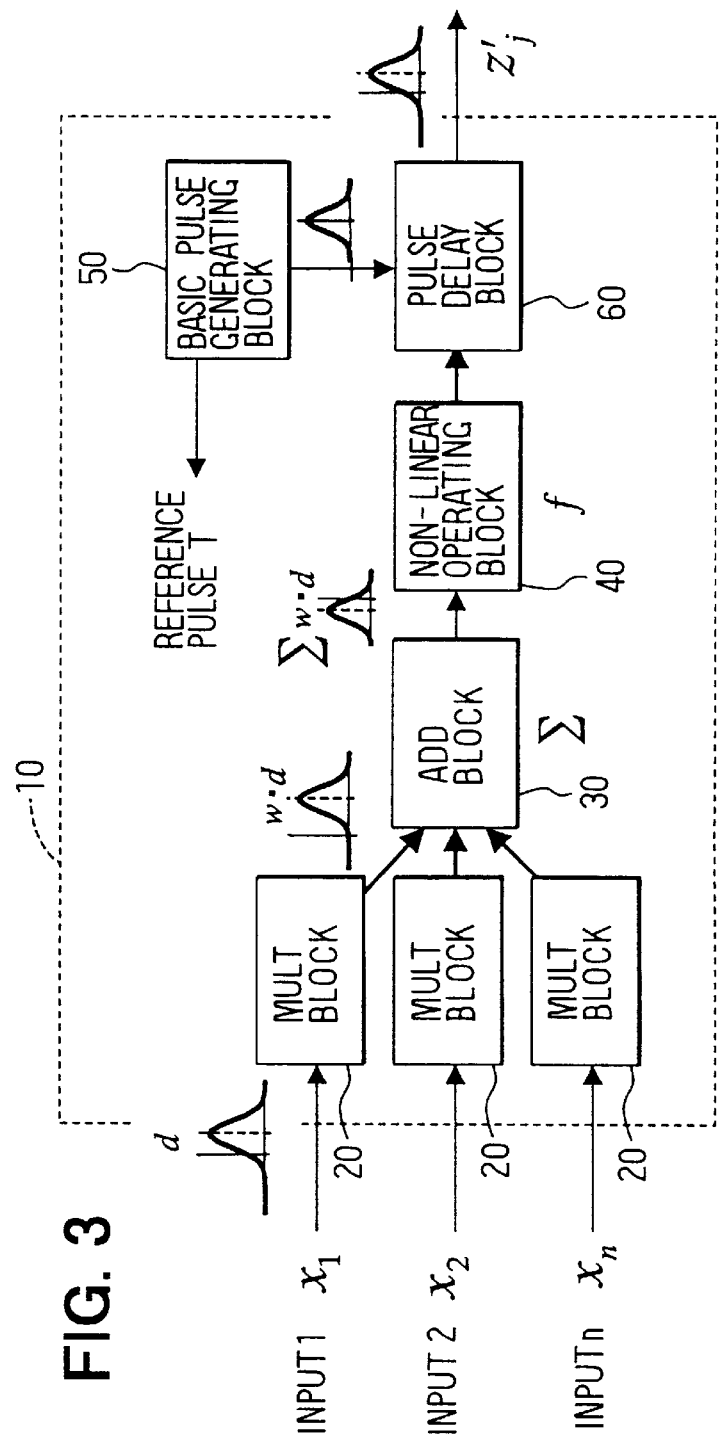
FIG. 3 is a block diagram illustrating functions of the neuron of the first embodiment.

FIG. 3 is a functional block diagram of the neuron 10. The neuron 10 comprises multiplying blocks 20, an adding block 30, a non-linear operating block 40, a basic pulse generating block 50 and a pulse delay block 60.

The delay time of each pulse of the input signal $x_i$ follows the normal distribution of $N(x_i, 1)$ as described above.

At first, the neuron 10 calculates m numerical values following the normal distribution of $N(w_{ji}x_i, 1)$ by using the link weight $w_{ji}$ corresponding to the input signal $x_i$ based on the delay time of m pulses in the multiplying block 20. The link weight $w_{ji}$ is stored in a register (not shown) provided per each multiplication block 20. Next, the neuron 10 adds the numerical values calculated in each multiplication block 20 in the adding block 30. The arithmetic operations in the multiplying block 20 and the adding block 30 corresponds to the operation in the expression (1).

Then, the non-linear functional block 40 counts a number of positive values within the added value of the adding block 30. The operation in the non-linear operating block 40 corresponds to the operation of the expression (2).

The basic pulse generating block 50 generates a pulse train in which the delay time of each pulse follows the normal distribution of average 0. The basic pulse generating block 50 also generates a reference pulse train composed of a reference pulse T of fixed time interval. The reference pulse T is also outputted to the other blocks 20, 30, 40 and 60. Then, based on the result of operation of the non-linear operating block 40, the pulse delay block 60 generates the output signal $z_j'$ in which each pulse of the pulse train generated by the basic pulse generating block 50 is delayed as the output signal of the neuron 10.

While the neuron 10 has been explained roughly above in the unit of function blocks, the structure and operation of each block will be explained below in detail.

Figure 4:
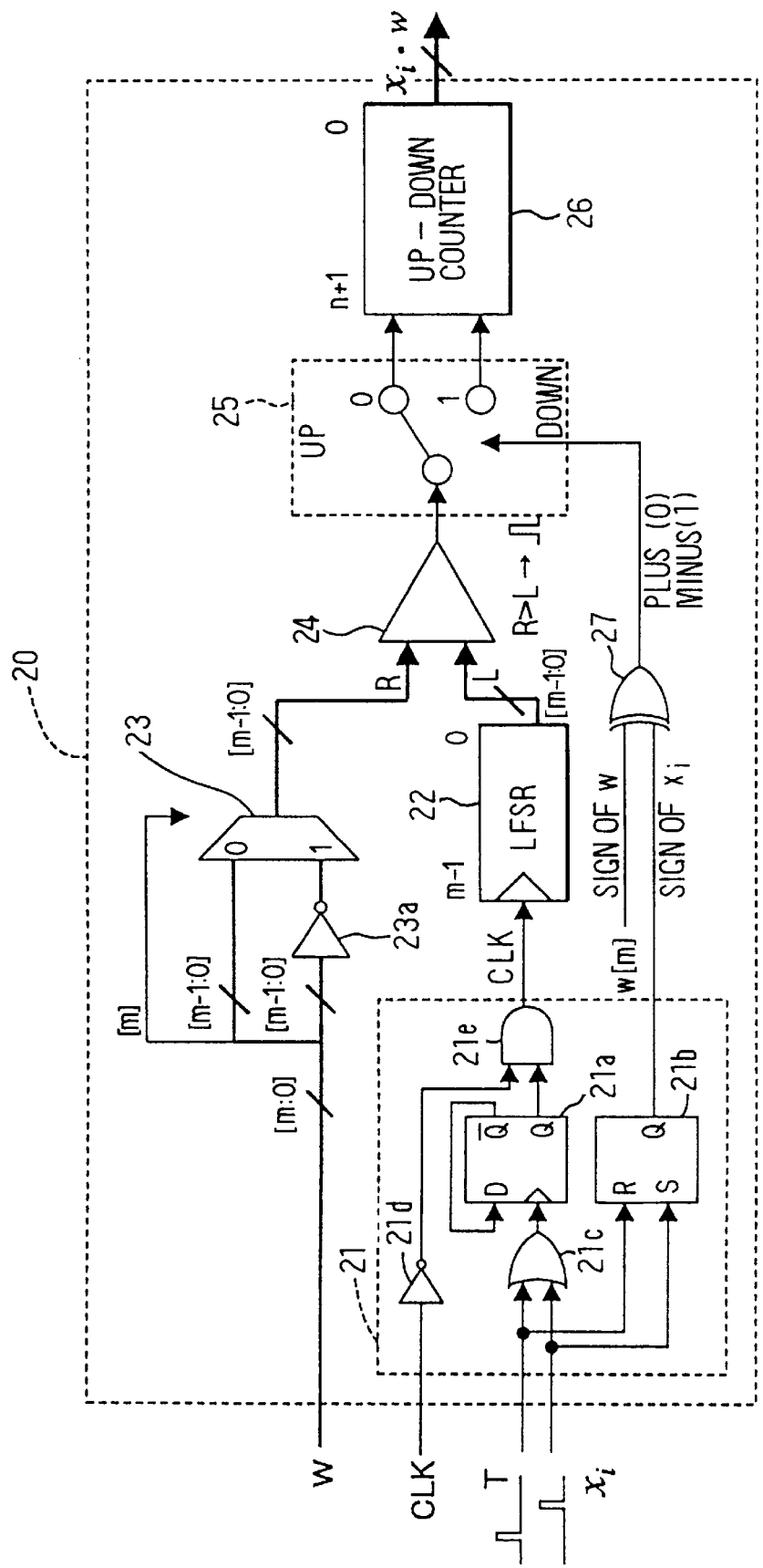
FIG. 4 is a circuit diagram illustrating a structure of a multiplying block of the first embodiment.

FIG. 4 is a circuit diagram showing the structure of the multiplying block 20. The multiplying block 20 comprises a delay time counting section 21, a linear shift register (hereinafter referred to as an "LFSR") 22 which is a uniform random number generator, an inversion switching section 23, a comparator 24, an up-down switch section 25, an up-down counter 26 and XOR gate 27.

The delay time counting section 21 comprises a D flip-flop (hereinafter referred to as a "DF/F") 21a, an SR flip-flop (hereinafter referred to as an "SRF/F") 21b, an OR gate 21c of two inputs, an inverting gate 21d and an AND gate 21e of two inputs.

The reference pulse T from the basic pulse generating block 50 and the pulse train $x_i$ as the input signal are inputted to the two input terminals of the OR gate 21c. An output terminal of the OR gate 21c is connected to a clock input terminal of the DF/F 21a. An inverted output terminal (Q−) of the DF/F 21a is connected to a data terminal (D) of the DF/F 21a and output terminal (Q) of the DF/F 21a is connected to one input terminal of the AND gate 21e. A clock signal (CLK) from the outside is inputted to the inverting gate 21d and output terminal of the inverting gate 21d is connected to the other input terminal of the AND gate 21e. Then, an output terminal of the AND gate 21e is connected to a clock terminal of the LFSR 22.

The reference pulse T is inputted to a reset terminal (R) of the SRF/F 21b and the input signal $x_i$ is inputted to a set terminal (S). An output terminal (Q) of the SRF/F 21b is connected to one input terminal of the XOR gate 27.

The LFSR 22 generates a uniform random number r represented by m bits [m−1: 0] every time when a pulse is inputted to the clock terminal. The random number r generated by the LFSR 22 is inputted to an input terminal (L) of the comparator 24.

Meanwhile, the link weight w is inputted to the other input terminal (R) of the comparator 24. The link weight w may be obtained from the register corresponding to each multiplication block 20 as described above. The link weight w is a numerical value of m+1 bits [m: 0] which is indicated as a plus value in case of excitative coupling or as a minus value in case of suppressive coupling by using the notation of 2's complement.

The most significant bit [m] of the link weight w is outputted to the other input terminal of the XOR gate 27 described above and is also outputted to the inversion switching section 23.

When the most significant bit [m] of the link weight w is "0", the inversion switching section 23 changes over the switch to the "0" side. Meanwhile, when the most significant bit [m] is "1", the inversion switching section 23 changes over the switch to the "1" side. Thereby, when the switch is changed over to the "0" side, the numerical value of m bits [m−1: 0] except of the most significant bit [m] is inputted to the input terminal (R) of the comparator as it is. When the switch is changed over to the "1" side on the other hand, each bit of m bits [m−1: 0] except of the most significant bit [m] is inverted by the inverting gate 23a and is inputted to the input terminal (R) of the comparator 24 as a numerical value of m bits. Thereby, the absolute value of the minus link weight w which has been expressed by the notation of 2's complement is inputted to the comparator 24. It is noted that although "1" must be added, strictly speaking, after the inversion when the notation of 2's complement is used, it is not added in the present embodiment in order to reduce the hardware because it does not specifically affect the processing accuracy of the neuron.

The random number r generated by the LFSR 22 is inputted to the input terminal (L) of the comparator 24 as described above. Meanwhile, the absolute value of the link weight w is inputted to the input terminal (R). The comparator 24 compares the both input values and outputs a pulse when the link weight w is greater than the random number r. The output from the comparator 24 is inputted to either one of an input terminal of the up-side or of the down-side of the up-down counter 26 through the up-down switch section 25.

An output terminal of the XOR gate 27 is connected to the up-down switch section 25. When the output of the XOR gate 27 is "0", the up-down switch section 25 changes over the switch to the "0" side or when it is "1", the up-down switch section 25 changes over the switch to the "1" side.

The up-down counter 26 is a counter of n+2 bits [n+1: 0] and counts in a manner of "0"→"1"→"2"→ . . . every time when a pulse is inputted to the up-side terminal. Meanwhile, it counts like "0"→"−1"→"−2"→ . . . every time when a pulse is inputted to the down-side terminal.

The operation of the multiplying block 20 constructed as described above will be explained below based on a circuit diagram in FIG. 4 and a timing chart in FIG. 5.

Figure 5:
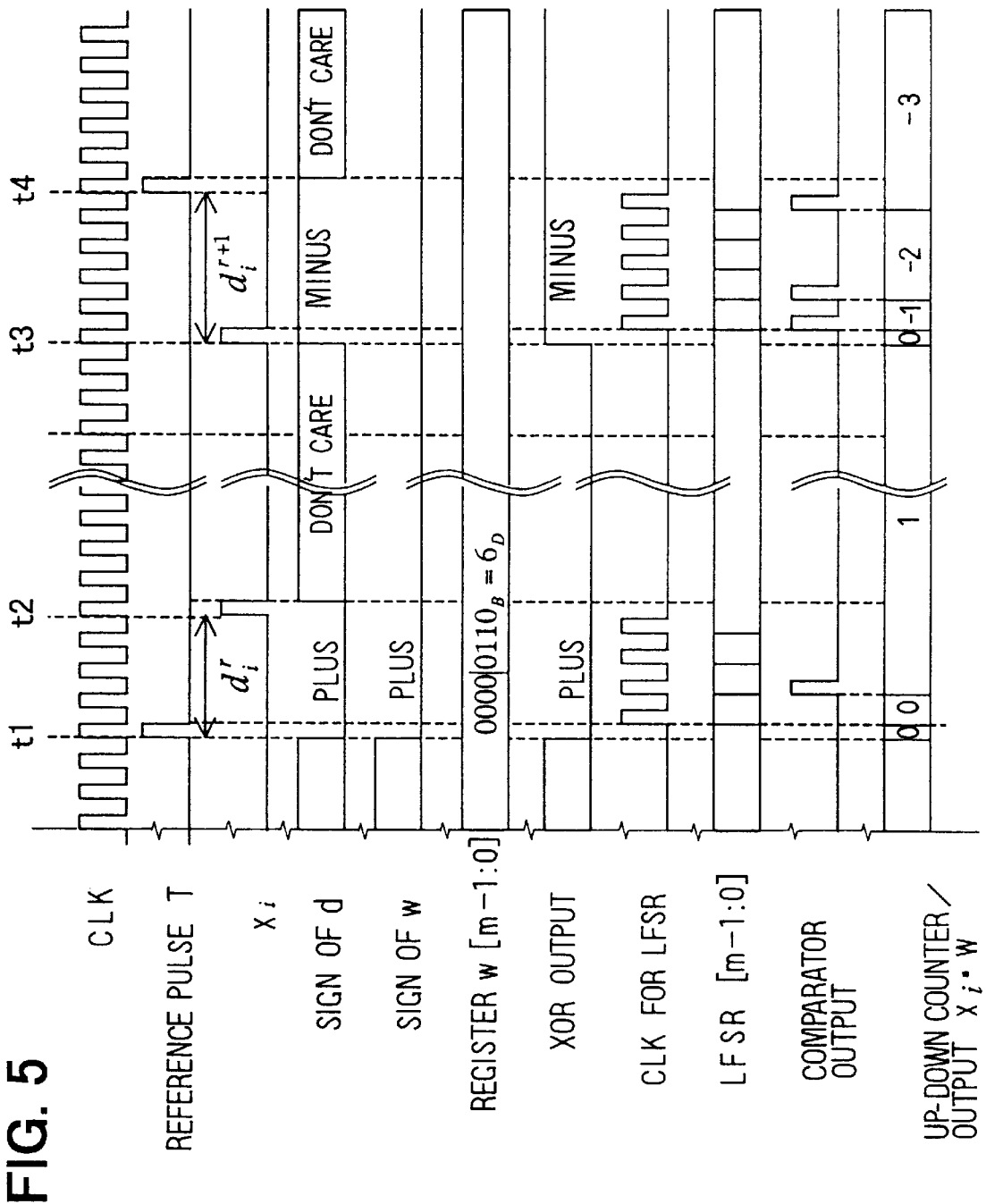
FIG. 5 is a timing chart illustrating operations of the multiplying block of the first embodiment.

When the reference pulse T is inputted at time t1 as shown in FIG. 5, a pulse is outputted from the output terminal of the OR gate 21c of the delay time counting section 21. Thereby, the Q terminal of the DF/F 21a is inverted to H level. Accordingly, a signal from the inverting gate 21d which has inverted the clock signal CLK is outputted from the AND gate 21e. As a result, the output of the clock signal operating the LFSR 22 is started.

Then, when a pulse of the input signal $x_i$ is inputted at time t2, a pulse is outputted from the output terminal of the OR gate 21c of the delay time counting section 21. Thereby, the Q terminal of the DF/F 21a is inverted to L level. Therefore, the output of the AND gate 21e is maintained at the L level and the output of the clock signal operating the LFSR 22 stops.

Accordingly, the clock signal to the LFSR 22 is outputted corresponding to the period of time t1 to t2, i.e. the delay time $d_i^x$ of the pulse, as shown in FIG. 4.

A pulse is inputted to the R terminal of the SRF/F 21b when the reference pulse T is inputted at time t1, so that the Q terminal of the SRF/F 21b is maintained at the L level.

Then, the Q terminal of the SRF/F 21b is maintained at the L level until when the pulse of the input signal $x_i$ is inputted at time t2, i.e., during the period of time t1 to t2. It means that the pulse of the input signal $x_i$ is delayed with respect to the reference pulse, i.e., the delay time $d_i^x$ of this pulse is plus. It is shown as "Sign of d" in FIG. 5.

The following explanation will be continued while assuming that the sign of the link weight w is plus as shown in FIG. 5 and the link weight w (register w)=6.

When the link weight w using the notation of 2's complement is a plus value, the most significant bit [m] of the m+1 bits [m: 0] register is "0". Accordingly, the inversion switching section 23 changes over the switch to the "0" side. Therefore, the numerical value of m bits [m−1: 0] except of the most significant bit [m] of the m+1 bit register is inputted to the comparator 24.

The most significant bit of the link weight is "0" and the output of the Q terminal of the SRF/F 21b of the delay time counting section 21 is also "0", so that the output of the XOR gate 27 is "0" (plus). It is shown as "XOR Output" in FIG. 5. Accordingly, the up-down switch section 25 changes over the switch to the "0" side. That is, it changes over the switch so that the output from the comparator 24 is inputted to the up-side terminal of the up-down counter 26.

It has been described that the clock signal to the LFSR 22 is outputted in the period of time t1 to t2. Four pulses are outputted as the clock signal during the period of time t1 to t2 as shown in FIG. 5. The LFSR 22 generates the random number r of m bits [m−1: 0] every time when the pulse is inputted as the clock signal. Then, this random number r is outputted to the L terminal of the comparator 24.

When the link weight w>random number r, the comparator 24 outputs a pulse to the up-down counter 26. It is counted as "0"→"1" by the up-down counter 26 because the case when the link weight w>random number r has occurred once in FIG. 5.

Meanwhile, the operation during the period from time t3 to t4 in FIG. 5 is the same with the operation during the period of time t1 to t2 described above. However, a pulse of the input signal $x_i$ is inputted at time t3 preceding to the reference pulse inputted at time t4. Then, the delay time $d_1^{x+1}$ is handled as minus in this case. The operation in handing the delay time $d_1^{x+1}$ as minus will be explained here.

When the pulse of the input signal $x_i$ is inputted at time t3 here, a pulse is inputted to the S terminal of the SRF/F 21b, so that the Q terminal of the SRF/F 21b is maintained at H level "1" until when the reference pulse is inputted at time t4. This means that the pulse of the input signal $x_i$ is advancing with respect to the reference pulse, i.e., that the delay time $d_1^{x+1}$ of this pulse is minus. It is shown as "Sign of d" in FIG. 5.

Because the sign of the link weight w is plus (0), the output of the XOR gate 27 turns out to be "1". Accordingly, the up-down switch section 25 changes over the switch to the "1" side. That is, it changes over the switch so that the output from the comparator 24 is inputted to the terminal of the down side of the up-down counter 26.

Therefore, the random number r is generated by the clock signal to the LFSR 22 corresponding to the delay time $d_1^{x+1}$ and the up-down counter 26 counts "0"→"−1"→"−2"→"−3" by the pulse output of the comparator 24.

It is noted that while the sign of the link weight w has explained to be plus here, the up-down counter 26 counts up when the both link weight w and the delay time d are plus or minus and counts down when either one of the link weight w or the delay time d is minus.

Thereby, when the pulse of the input signal $x_i$ precedes with respect to the reference pulse, it is converted into a minus numerical value by the multiplying block 20.

Here, the set of the output values of the up-down counter 26 of the multiplying block 20, i.e., the distribution of numerical values of "1" corresponding to the delay time $d_1^x$ and "−3" corresponding to the delay time $d_1^{x+1}$, are normal distribution of N(wx, 1). This will be explained here.

This multiplying block 20 is what the approximation of normal distribution of binomial distribution is applied. The approximation of normal distribution of binomial distribution is the quality that the binomial distribution approaches to the normal distribution of average value n·P when n is incremented in the trial of n times following the binomial distribution. Here, P is the probability of "success" of the result in one time of trial. When P=w and n=d by using this quantity, the probability of "success" in d times of trial is wd in average. That is, it follows the normal distribution of average wx when the average of the delay time d is assumed to be x. That is, the trial corresponding to the delay time d is the occurrence of random numbers r by the LFSR 22 and the pulse output from the comparator 24 is the number of times of "success" which is counted by the up-down counter 26 in the multiplying block 20. That is, the output value (absolute value) of the up-down counter 26 is the number of times of "success" in d times of trial. As a result, the set of the output values of the up-down counter 26 follows the normal distribution of average wx.

Next, the adding block 30 will be explained.

Figure 6:
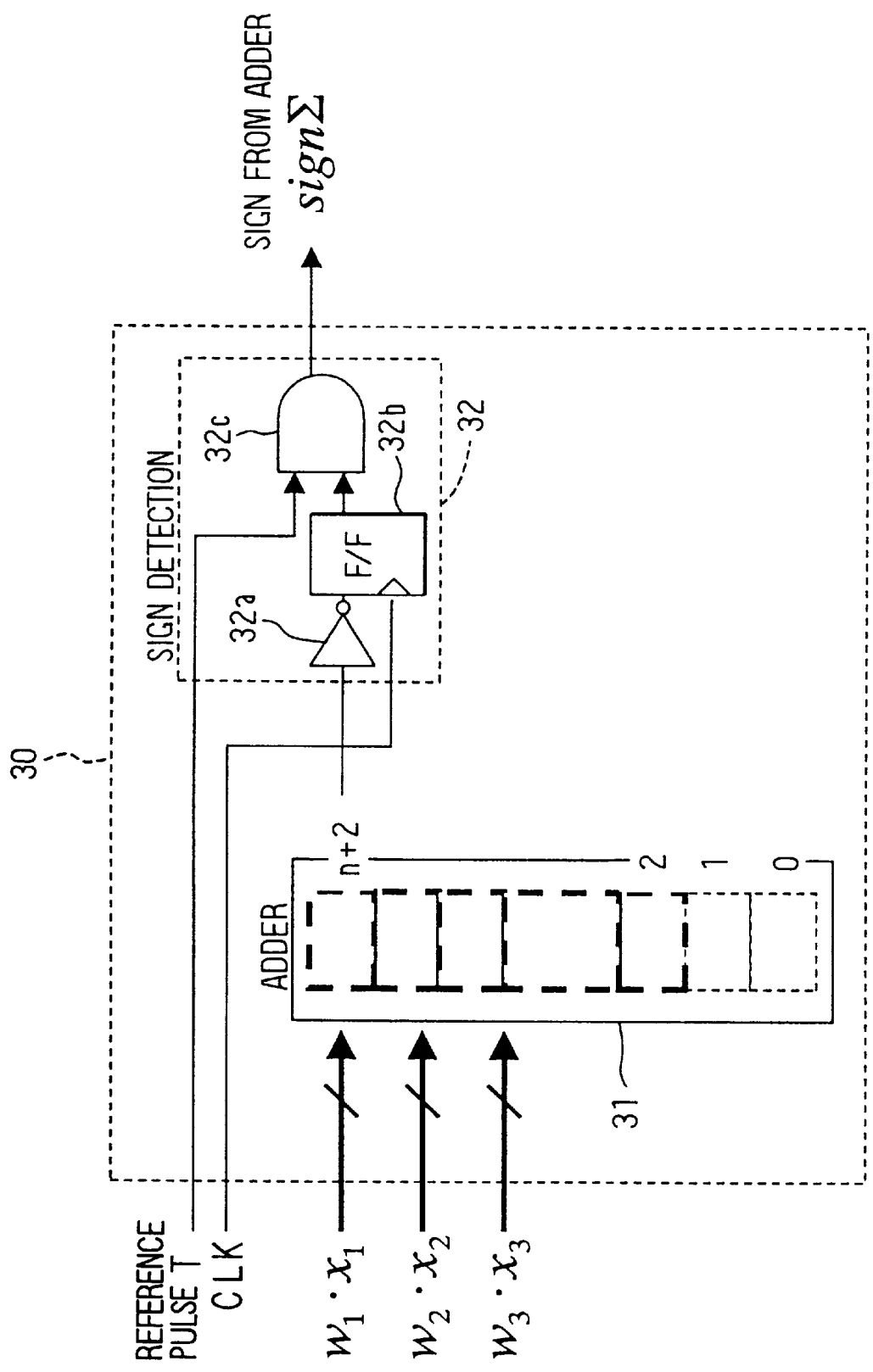
FIG. 6 is a circuit diagram illustrating a structure of an adding block of the first embodiment.

FIG. 6 is a circuit diagram showing the structure of the adding block 30. The adding block 30 comprises an adder 31 and a sign detecting section 32.

The adder 31 is n+3 bits [n+2: 0]. An output value w·x from the up-down counter 26 of the multiplying block 20 is outputted to the adder 31. The output values from the respective multiplying blocks 20 shown in FIG. 3 will be described as $w_1 \cdot x_1$, $w_2 \cdot x_2$ and $w_3 \cdot x_3$. The output value w·x is represented by the notation of 2's complement, so that the most significant bit [n+2] is a sign bit.

The sign detecting section 32 comprises an inverting gate 32a, a flip-flop (hereinafter referred to as an "F/F") 32b and an AND gate 32c of two outputs.

The most significant bit [n+2] of the adder 31 is inputted to the inverting gate 32a. An output terminal of the inverting gate 32a is connected to an input terminal of the F/F 32b. A clock signal from the outside is inputted to a clock terminal of the F/F 32b. An output terminal of the F/F 32b is connected to one input terminal of the AND gate 32c and the reference pulse T is inputted to the other input terminal of the AND gate 32c. Then, an output signal from the AND gate 32c is outputted as a pulse signal sign$\Sigma$. Here, the output of the AND gate 32c is the sign of the result of addition of the adder 31.

The operation of the adding block 30 constructed as described above will be explained below based on the circuit diagram in FIG. 6 and a timing chart in FIG. 7.

The output values w·x from the respective multiplying blocks 20 are inputted to the adder 31 as described above. The adder 31 adds those strings of numerical values of the same string outputted from the respective multiplying blocks 20 in the time series manner. See the column indicated as "Adder" in FIG. 7.

The most significant bit [n+2] of the adder 31 is inputted to the sign detecting section 32 as shown in FIG. 6. The most significant bit of the adder 31 is inputted to the F/F 32b via the inverting gate 32a. Accordingly, when the result of addition is plus, the output terminal of the F/F 32b turns to H level "1" and when it is minus in contrary, the output terminal of the F/F 32b turns to L level "0". Then, when the reference pulse is inputted, the output of the F/F 32b becomes the output of the AND gate 32c.

Figure 7:
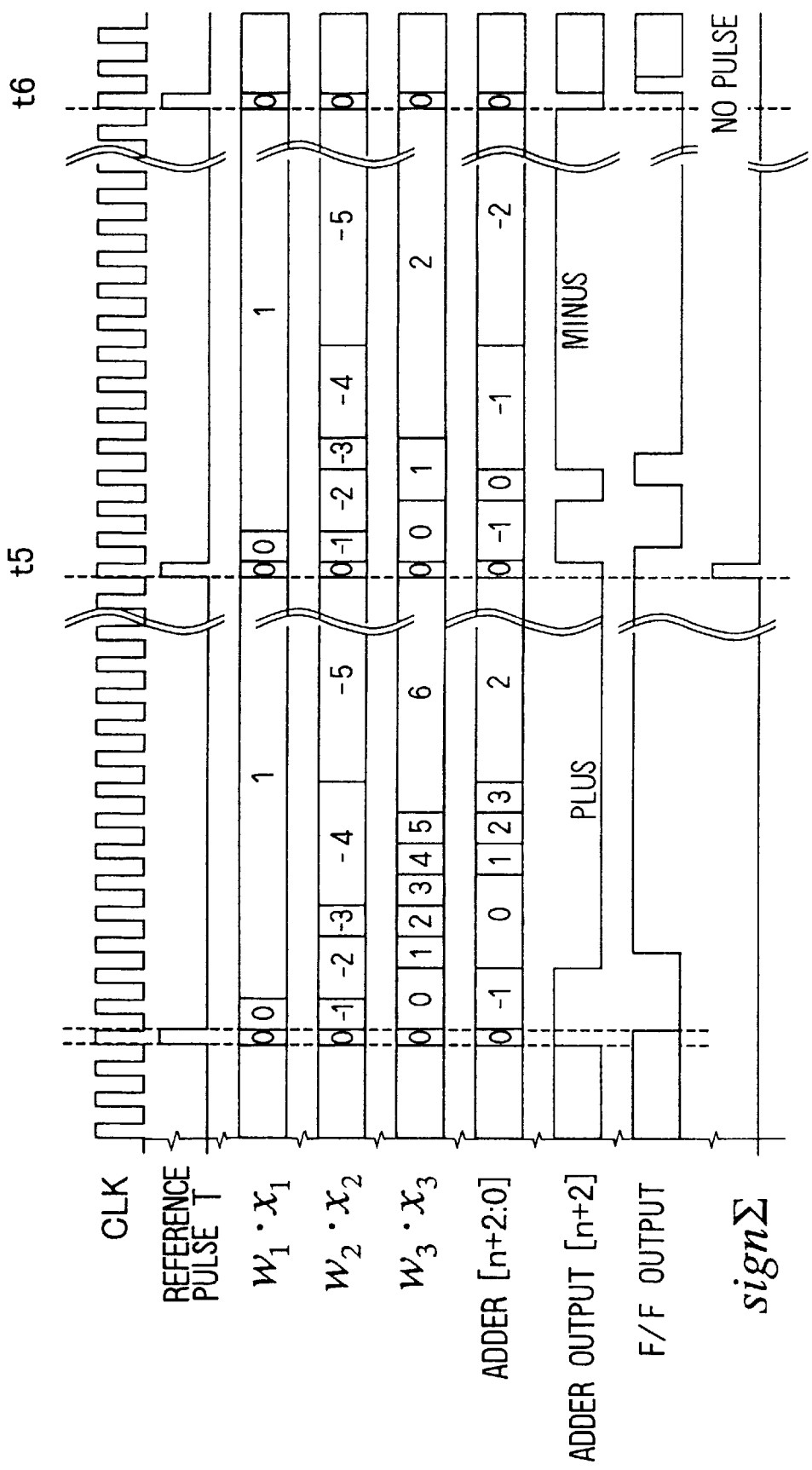
FIG. 7 is a timing chart illustrating operations of the adding block of the first embodiment.

That is, because the most significant bit of the adder 31 is "0" (plus) at time t5 in FIG. 7, the output of the F/F 32b is "1" (plus). Therefore, when the reference pulse is inputted at time t5, a pulse indicative of that the result of addition $\Sigma w \cdot x$ is plus is outputted from the AND gate 32c. Meanwhile, because the most significant bit of the adder is "1" (minus) at time t6, the output of the F/F 32b is "0" (minus). Therefore, no pulse is outputted from the AND gate 32c even if the reference pulse is inputted at time t6.

Next, the non-linear operating block 40 will be explained.

Figure 8:
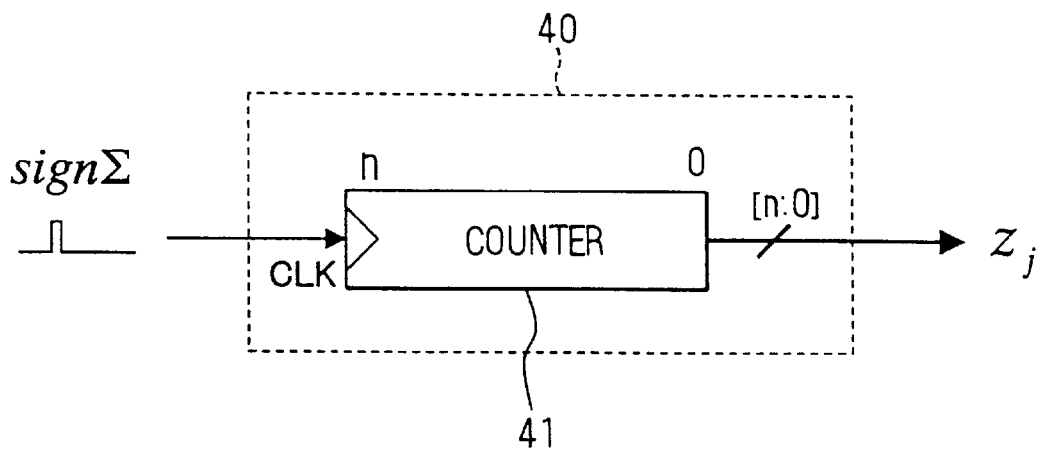
FIG. 8 is a circuit diagram illustrating a structure of a non-linear operating block of the first embodiment.

FIG. 8 is a circuit diagram showing the structure of the non-linear operating block 40. The non-linear operating block 40 comprises a counter 41 of n+1 bits [n: 0]. A signal sign$\Sigma$ is inputted to a clock terminal (CLK) of the counter 41 from the sign detecting section 32 of the adding block 30 described above. This signal is a pulse as described above and is outputted when the result of addition of the adding block 30 is a positive value at the point of time when the reference pulse is inputted to the adding block 30.

Accordingly, the counter 41 counts a number of positive values within the result of addition. The counter 41 outputs a numerical value $z_j$ of n+1 bits [n 0].

Here, $z_j$ will be explained in correspondence to FIG. 8.

When the input signal $x_i$ in which the delay time of each pulse follows the normal distribution of $N(x_i, 1)$ is inputted, the numerical value following the normal distribution of $N(w_i x_i, 1)$ has been calculated by using the link weight $w_i$ in the multiplying block 20 as described above. Then, those numerical values have been added by the adding block 30.

Figure 9:
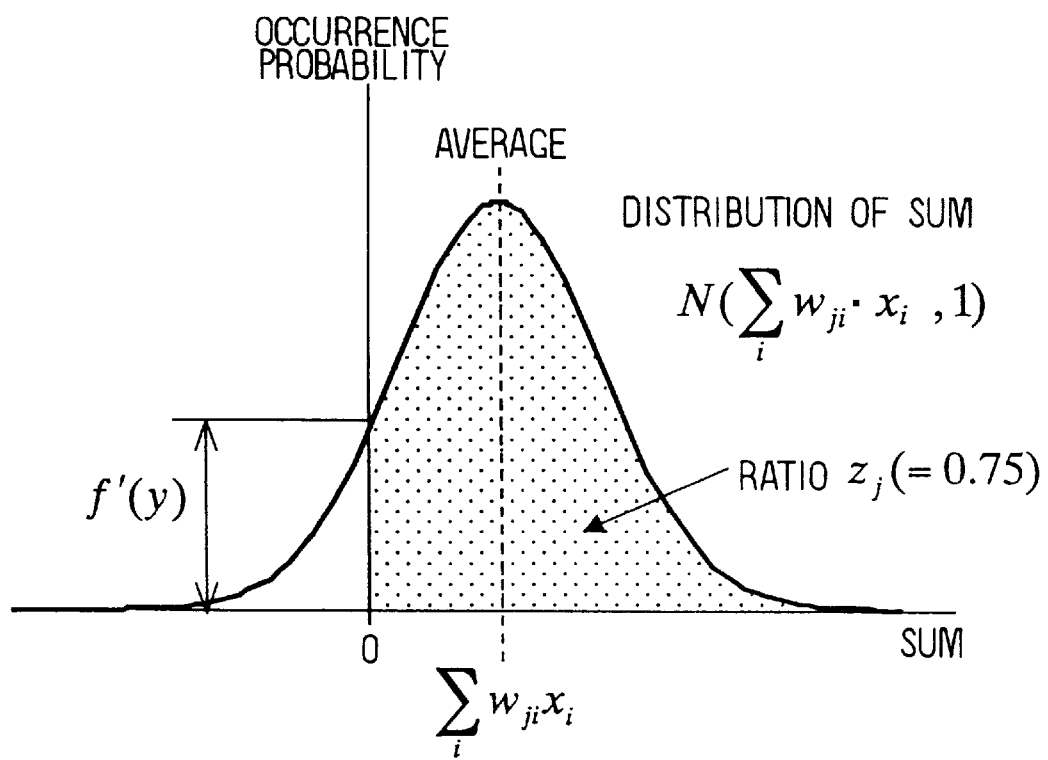
FIG. 9 is a diagram illustrating a mathematical stand of view of sum.

Accordingly, the distribution of the added values in the adding block 30 is a normal distribution of $N(\Sigma_{ji} i x_i, 1)$ as shown in FIG. 9. That is, the above-mentioned numerical value $z_j$ corresponds to the number of positive values within the added value (delay time from each T) within FIG. 9, i.e., to the hatched domain. It is noted that the area of this domain is what a normal distribution curve has been integrated and causes non-linearity.

Next, the basic pulse generating block 50 will be explained.

Figure 10:
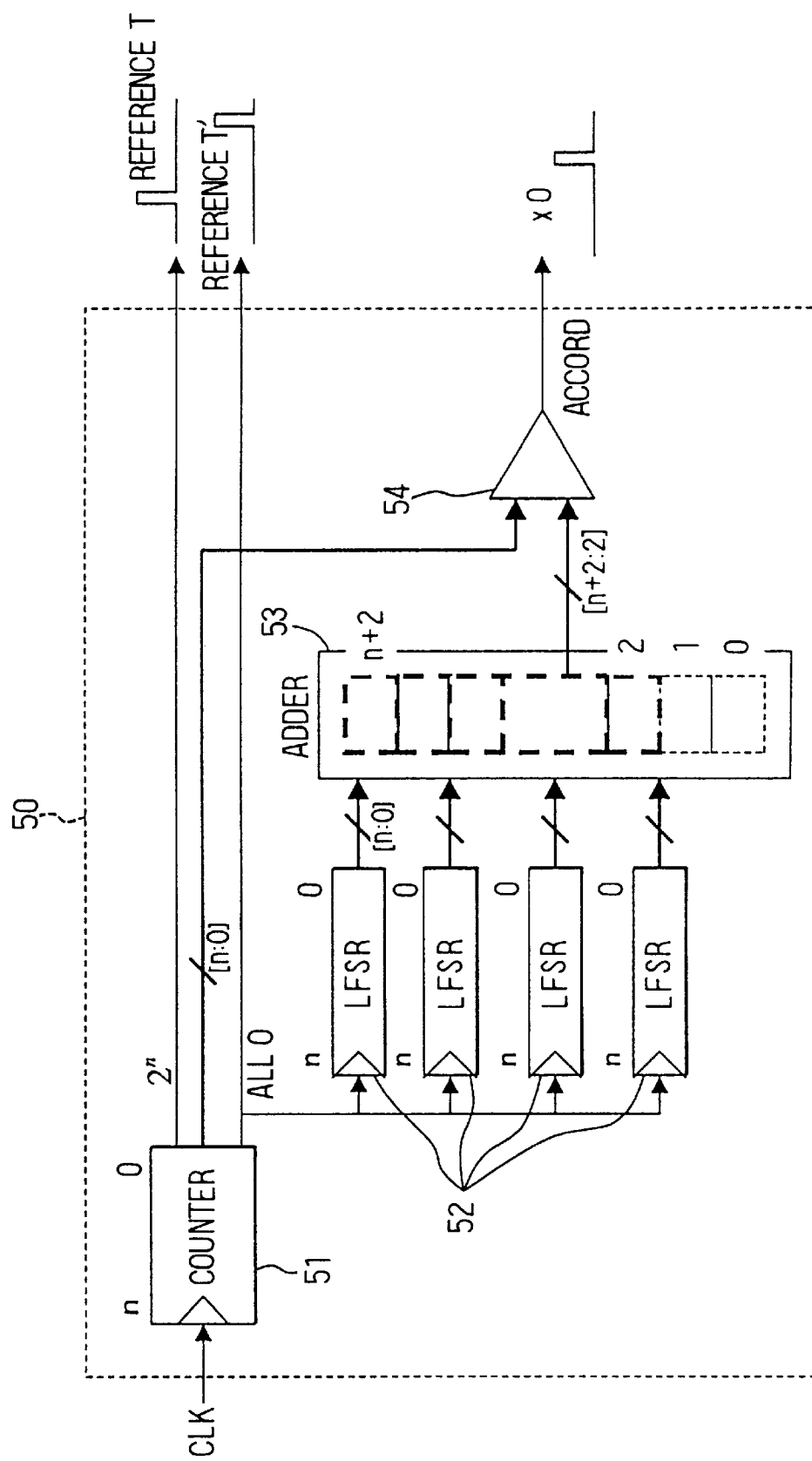
FIG. 10 is a circuit diagram illustrating a structure of a basic pulse generating block of the first embodiment.

FIG. 10 is a circuit diagram showing the structure of the basic pulse generating block 50. The basic pulse generating block 50 comprises a counter 51 of n+1 bits [n: 0], four LFSRs 52 which are uniform random number generators, an adder 53 and a comparator 54.

The clock signal (CLK) is inputted to a clock terminal of the counter 51 from the outside. The counter 51 counts up as the clock signal (CLK) is inputted. When n 6 for instance, it counts repeatedly from 0 to 127 ($=2^7-1$).

The counter 51 outputs a value of count. It also outputs a pulse as it judges that the count is "0" or "$2^{n}$". The pulse outputted when the count is "0" is distinguished to be the reference pulse T' and the pulse outputted when the count is "$2^{n}$" to be the reference pulse T. The reference pulse T outputted when the count is "0" is inputted to the clock terminal of the four LFSRs 52.

When the pulse is inputted to the clock terminal, the LFSR 52 generates random numbers of n+1 bits [n: 0]. Accordingly, the LFSR 52 generates the random numbers of n+1 bits [n: 0] every time when value of the counter 51 becomes "0". When n=6, each LFSR 52 generates numerical values within the range of 1 to 127 (=$2^7$−1) at random.

The adder 53 adds the random numbers generated by the respective LFSRs 52. Then, the high order n+1 bits [n+2: 2] of the adder 53 is outputted to one input terminal of the comparator 54. The count of n+1 bits [n: 0] of the counter 51 is inputted to the other input terminal of the comparator 54. When the numerical values of n+1 bits inputted to the both input terminals coincide, the comparator 54 outputs a pulse x0.

Figure 11:
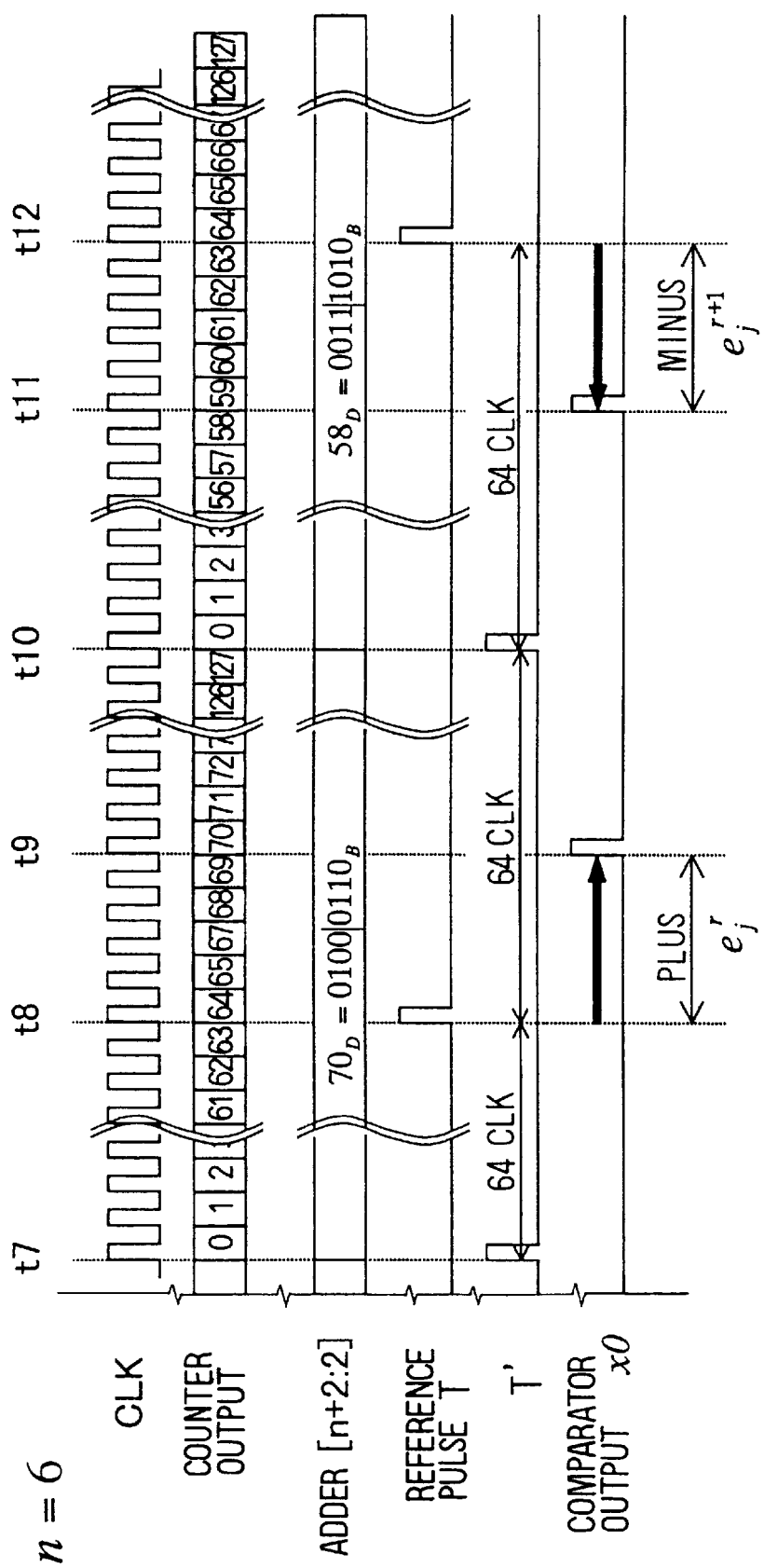
FIG. 11 is a timing chart illustrating operations of the basic pulse generating block of the first embodiment.

The operation of the basic pulse generating block 50 constructed as described above will be explained below based on the circuit diagram in FIG. 10 and a timing chart in FIG. 11. The timing chart shown in FIG. 11 shows the case when n in the circuit diagram in FIG. 10 is 6". Accordingly, the following explanation will be given by assuming as n=6 continuously.

Because the counter 51 outputs the reference pulse T' when the count becomes "0" (at times t7 and t10 in FIG. 11), the four LFSRs 52 output the random numbers of 1 to 127 to be inputted to the adder 53. Accordingly, while the value added by the adder 53 turns out to be a random numerical value of 4 to 508 (=127×4), a random numerical value following the normal distribution from 1 to 127 is inputted to the comparator 54 because the output of the adder 53 is high order 7 bits [8: 2]. That is, a value obtained by dividing the added value by 4 is inputted to one input terminal of the comparator 54 as the result of addition.

For instance, FIG. 11 shows cases when the value obtained by dividing the result of addition of the adder 53 by 4 is "70" at time t7 and is "58" at time t10. Accordingly, "70" is outputted to the comparator 54 at time t7 and "58" is outputted to the comparator 54 at time t10.

The count of the counter 51 is inputted to the other input terminal of the comparator 54. Accordingly, the comparator 54 outputs the pulse x0 at the point of time when the count of the counter 51 is "70" (at time t9 in FIG. 11) after when the result is outputted from the adder 53 to the comparator 54 at time t7. The comparator 54 also outputs the pulse x0 at the point of time when the count of the counter 51 is "58" (at time t11 in FIG. 11) after when the result is outputted from the adder 53 to the comparator 54 at time t10.

Meanwhile, the counter 51 outputs the reference pulse T when the count is "64 (=$2^6$)". Accordingly, the pulse x0 outputted from the comparator 54 at time t9 delays behind the reference pulse outputted from the at time t8 by time $e_j^r$. Contrary to that, the pulse x0 outputted from the comparator 54 at time t11 precedes the reference pulse outputted at time t12 by time $e_j^{r+1}$.

The delay time of the pulse x0 outputted from the comparator 54 from the respective reference pulses T is $e_j$, the distribution of the delay times $e_j$ follows the normal distribution of N(0, 1). This will be explained below.

It has been known that when a large number random numbers whose distribution is finite are added, it approaches to the normal distribution by the central limit theorem. For instance, the distribution of values obtained by adding 12 uniform random numbers U (0≦U<1) and by subtracting by 6 becomes a normal distribution of N(0, 1).

Therefore, the distribution of result of addition 1 to 127 of the adder 53 of the random numbers generated by the LFSR 52 almost follows the normal distribution of N(64, 1). Accordingly, the distribution of the delay times $e_j$ from the reference pulse outputted when the count is "64" also almost follows the normal distribution of N(0, 1).

Figure 12:
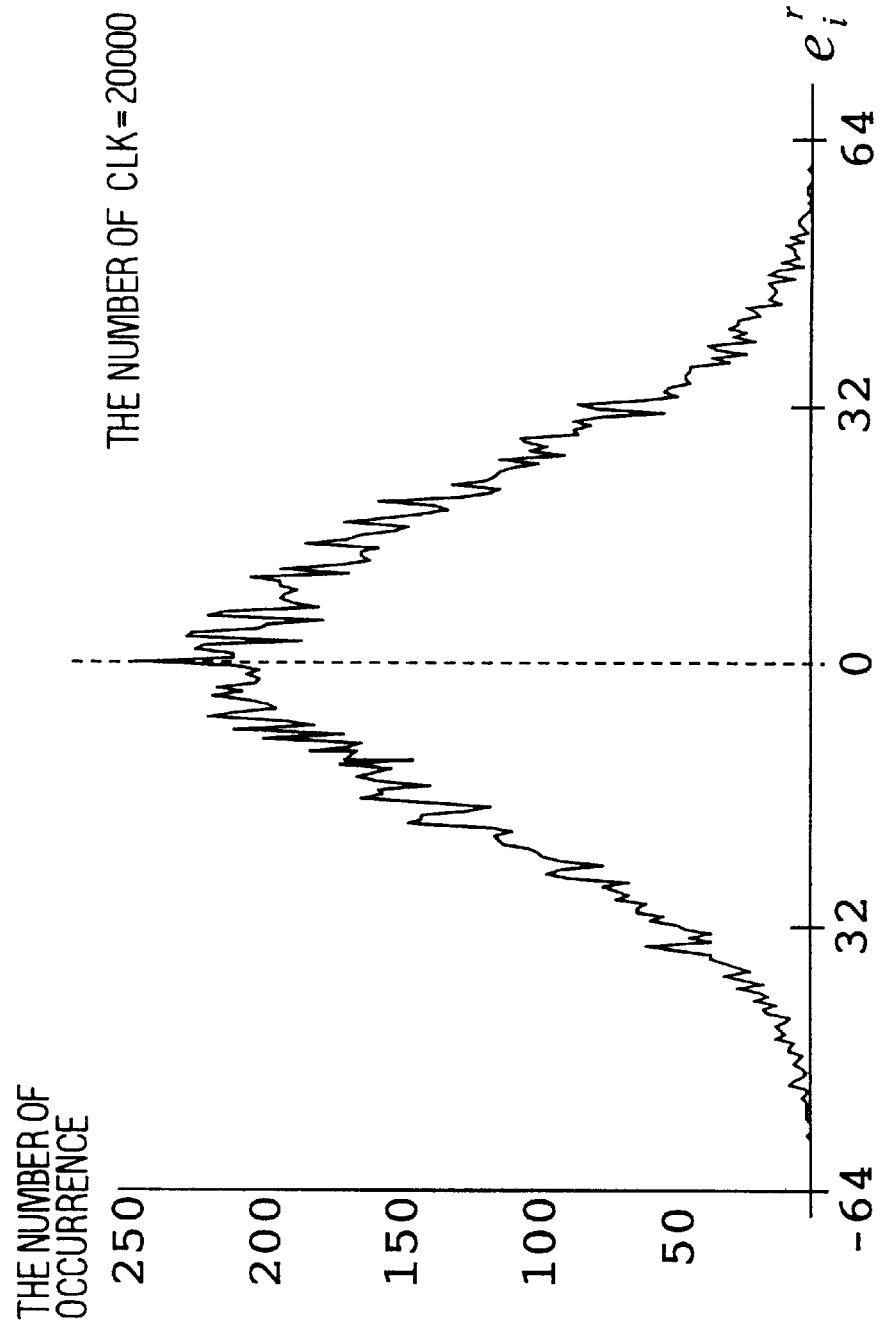
FIG. 12 is a diagram illustrating a distribution of pulse delay times generated based on random numbers.

FIG. 12 is a graph obtained by actually plotting the distribution of the delay times $e_j$ by the comparator of the basic pulse generating block 50 described above.

Next, the pulse delaying block 60 will be explained.

Figure 13:
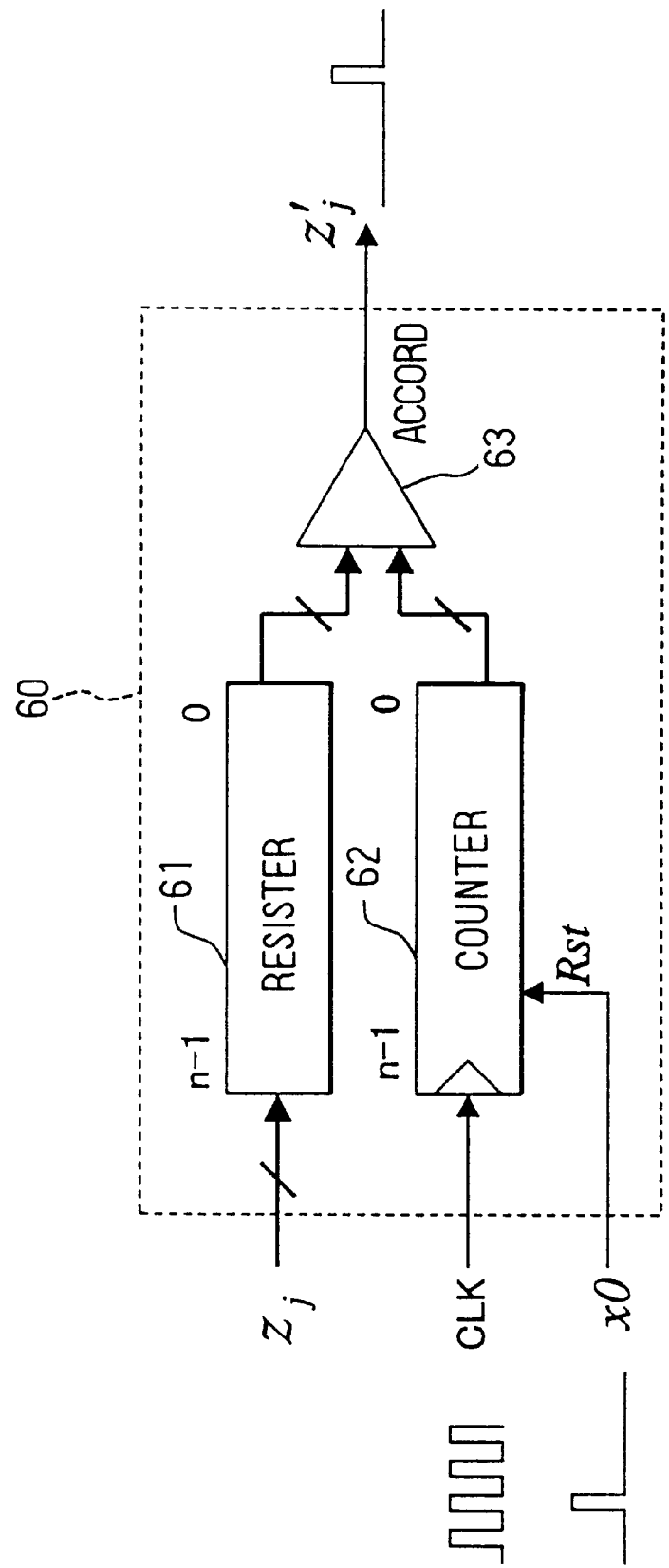
FIG. 13 is a circuit diagram illustrating a structure of a pulse delaying block of the first embodiment.

FIG. 13 is a circuit diagram showing the structure of the pulse delaying block 60. The pulse delaying block 60 comprises a register 61 of n bits [n−1: 0], a counter 62 of n bits [n−1: 0]and a comparator 63. A value of the register 61 is inputted to one input terminal of the comparator 63 and a count of the counter 62 is inputted to the other input terminal of the comparator 63.

The output value $z_j$ of the non-linear operating block 40 described above is stored in the register 61. The clock signal (CLK) from the outside is inputted to a clock terminal of the counter 62 and the counter 62 counts up in accordance to this clock signal. The pulse x0 from the comparator 54 described above is inputted to a reset terminal of the counter 62. The counter 62 is reset to "0" by this pulse x0. The comparator 63 outputs a pulse when the values inputted to the both input terminals coincide.

The operation of the pulse delaying block 60 constructed as described above will be explained based on the circuit diagram shown in FIG. 13 and a timing chart in FIG. 14. It is noted that the timing chart in FIG. 14 will be explained below by assuming that n=6 to illustrate the case when n in the circuit diagram in FIG. 13 is "6".

Figure 14:
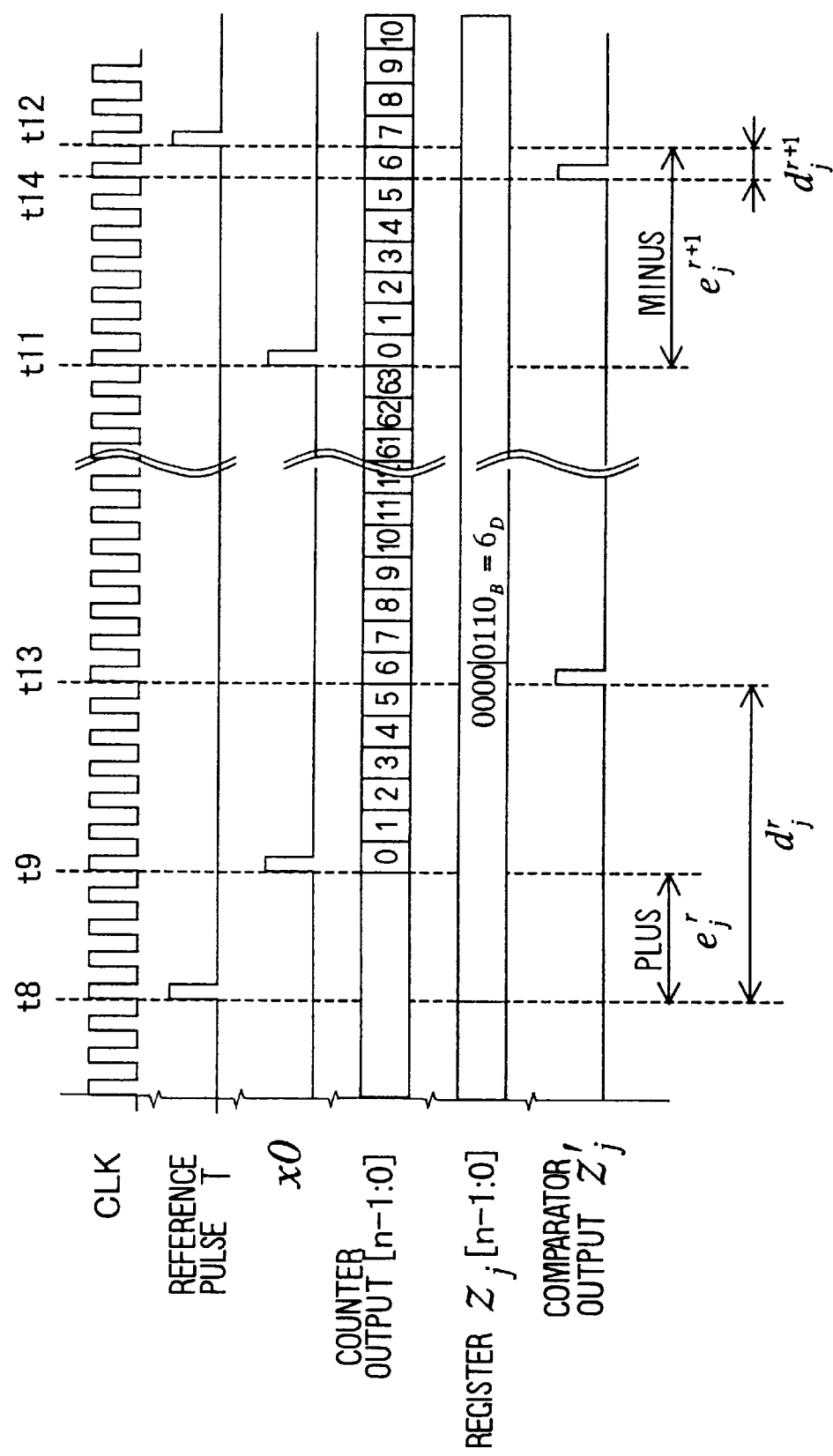
FIG. 14 is a timing chart illustrating operations of the pulse delaying block of the first embodiment.

The $z_j$ stored in the register 61 is "6" as shown in FIG. 14. Accordingly, "6" is inputted to one input terminal of the comparator 63.

When the pulse x0 is outputted from the comparator 54 of the basic pulse generating block 50 at time t9, the counter 62 is reset to "0". Accordingly, the counter 62 starts to count up from time t9. Then, because the value of count is "6" at time t13, the comparator 63 outputs a pulse.

When the pulse x0 is outputted from the comparator 54 of the basic pulse generating block 50 described above at time t11, the counter 62 is reset to "0". Accordingly, the counter 62 starts to count up again from time t11. Then, because the value of count is "6" at time t14, the comparator 63 outputs a pulse.

The delay time of the two pulses outputted from the comparator 63 shown in FIG. 14 corresponds to the period $d_j^r$ from t8 to t13 and the period $d_j^{r+1}$ from t14 to t12, respectively, because the reference pulse T is generated at times t8 and t12.

Then, each pulse of the pulse train $z_j$ outputted from the comparator 63 is generated by delaying each pulse x0 outputted from the comparator 54 of the basic pulse generating block 50 by $z_j$. Accordingly, the delay time $d_j$ of each pulse of the pulse train $z_j$ follows the normal distribution of N($z_j$, 1).

Then, the pulse train $z_j$ from the pulse delaying block 60 is outputted to the outside as the output signal of the j-th neuron 10.

It is noted that the multiplying block 20 in the present embodiment corresponds to "multiplication corresponding value calculating means", the adding block 30 corresponds to "adding means", the non-linear operating block 40 corresponds to "non-linear computing means" and the basic pulse generating block 50 and the pulse delaying block 60 correspond to "pulse train generating means". The basic pulse generating block 50 corresponds to "reference pulse generating means" and "basic pulse generating means" and the pulse delaying block 60 corresponds to "delaying means".

The LFSR 52 of the basic pulse generating block 50 corresponds to the "uniform random number generator", the adder 53 corresponds to "random number adding means" and the comparator 54 corresponds to "pulse outputting means".

Next, the effects of the neuron 10 of the present embodiment will be explained.

It is possible to obtain the merits in using a digital circuit that it becomes possible to realize complete parallel processing, to form the circuit relatively easily without being influenced by temperature characteristics and by variations in the processes in forming devices and to improve the reliability by constructing the neural network by using the neurons 10 of the present embodiment.

The neuron 10 of the present embodiment also expresses a value of signal to be processed by using delay time of each pulse. As a result, it brings about the following effects.

It has been unable to distinguish the excitative coupling from the suppressive coupling when pulse density is utilized for the signal of neurons as disclosed in Japanese Patent Laid-Open No. Hei. 7-11524. Therefore, it has divided each coupling into two groups of excitative coupling and suppressive coupling by plus/minus of link weights. As a result, the synapse circuit and the nerve circuit in the publication have been connected by two systems of signal lines.

However, according to the invention, it is possible to express the excitative coupling and the suppressive coupling by one signal by using the delay time of pulse and by assuming the delay time of pulse preceding a reference pulse as minus. Accordingly, the signal line may be reduced as compared to the prior art arrangement using the pulse density by constructing a hierarchical network by using the inventive neurons 10. Specifically, the wiring corresponding to the part connecting the synapse circuit with the nerve circuit in the prior art system is reduced into a half.

Because the neuron 10 of the present embodiment utilizes the quality that the distribution function of normal distribution becomes a saturated monotonous increment function, the non-linear operating block 40 is constructed by one counter 41 as shown in FIG. 8. Accordingly, it is also advantageous in that the area of the circuit for the non-linear arithmetic operation may be relatively reduced.

Further, the neuron 10 of the present embodiment is constructed without using a multiplier circuit composed of so-called adder circuits for the multiplying block 20 by utilizing the approximation of normal distribution of binomial distribution (see FIG. 4). When the present applicant compared its circuit area with that of the multiplying block constructed by using the multiplier circuit, it was possible to construct the multiplying block 20 with a circuit area of about 1/11, i.e., to reduce the circuit area of the neuron 10 considerably.

Still more, according to the neuron 10 of the present embodiment, the pulse train having the pulses of delay time following the normal distribution may be simply generated by generating the pulse train in which the delay time of each pulse follows the normal distribution of N(0, 1) by the basic pulse generating block 50 and by generating the pulse train as the output signal of the neuron 10 by delaying by the pulse delaying block 60.

Then, the basic pulse generating block 50 generates the pulse train by using the LFSR 52, i.e., the uniform random number generator (see FIG. 10), and by applying the central limit theorem in generating the pulse train in which the delay time of pulse follows the normal distribution of N(0, 1). Therefore, the pulse train may be generated by the relatively simple circuit structure.

Although it is necessary to divide the added value by using a dividing circuit or the like when a plurality of uniform random numbers U ($0 \leq U < 1$) are added at this time, the division is executed by adding the random numbers from the four uniform random number generators 52 and by dividing the low order 2 bits of the data of added value as shown in FIG. 10. Accordingly, the circuit area of the neuron 10 may be reduced further in this point without using the dividing circuit.

Second Embodiment

There has been a case when each pulse $z_j$ of the pulse train $z_j'$, the output signal, precedes the reference pulse T in the neuron 10 of the first embodiment. However, the neuron may be constructed so that the pulse $z_j$ is always outputted behind the reference pulse.

One of characteristic points of the invention is to express the excitative coupling and the suppressive coupling by one signal by utilizing the pulse delay time as described above because the use of the pulse delay time enables the link weight and the multiplication corresponding value to be processed internally as minus values. Then, it will do if they can be processed as minus values. Accordingly, it is possible to arrange so that the delay time of the pulse, i.e., the signal, of the neuron 100 becomes always plus, i.e., so that the pulse is generated behind the reference pulse.

Then, an arrangement for generating input and output signals of the neuron behind the reference pulse will be illustrated in the second embodiment.

A neuron to which an arrangement for learning is added will be also explained in the second embodiment. Accordingly, the neuron of the second embodiment is used to compose a three-layered hierarchical neural network. An arrangement for generating the reference pulse T, which has been generated within each neuron 10, on the outside of the neuron will be also explained.

The neuron of the second embodiment is also the functional unit of the hierarchical (or specifically the three-layered hierarchical) neural network as shown in the diagrammatic view in FIG. 1. The input/output signal of the neuron is the same with that of the neuron 10 described above. Accordingly, an explanation of each signal will be omitted here.

However, the reference pulse which has been generated within the neuron in FIG. 1 is generated on the outside of the neuron as described above. Further, each pulse of the pulse train, i.e., the signal between the neurons, does not precede the reference pulse. In terms of FIG. 2, the pulse $s_1^1$ of the input signal $x_1$ will not precede the reference pulse $T^1$ for example.

The neuron of the second embodiment will be explained below in detail.

Figure 17:
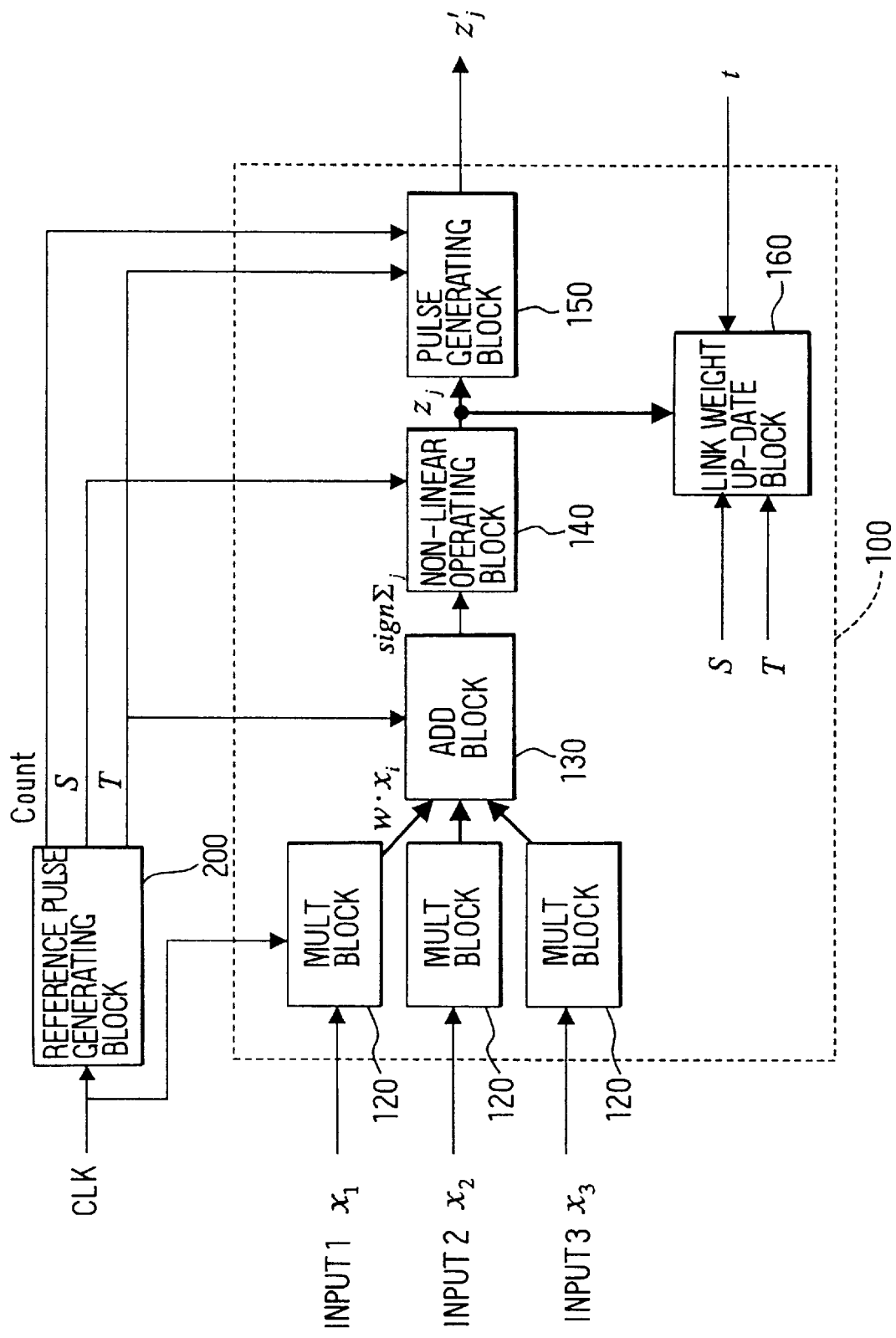
FIG. 17 is a block diagram illustrating functions of a neuron of a second embodiment.

FIG. 17 is a functional block diagram of the neuron 100 of the second embodiment. The neuron 100 comprises multiplying blocks 120, an adding block 130, a non-linear operating block 140, a pulse generating block 150 and a link weight updating block 160. It is noted a reference pulse generating block 200 is provided on the outside of the neuron and supplies predetermined signals to the respective neurons 100 composing the neural network.

The delay time of each pulse of the input signal $x_i$ follows the normal distribution of $N(x_i, 1)$ in the same manner with the first embodiment.

At first, the neuron 100 calculates m numerical values following the normal distribution of $N(w_{ji}x_i, 1)$ by using the link weight $w_{ji}$ corresponding to the input signal $x_i$ based on the delay time of m pulses in the multiplying block 120. The link weight $w_{ji}$ is stored in a register (not shown) provided per each multiplying block 120. Next, the neuron 100 adds the numerical values calculated in the respective multiplying blocks 120 in the adding block 130. The arithmetic operations in the multiplying block 120 and the adding block 130 correspond to the operation in the expression (1).

Then, the neuron 100 counts a number of positive values within the added value of the adding block 130 in the non-linear functional block 140. The operation in the non-linear operating block 140 corresponds to the operation of the expression (2).

The neuron 100 generates a pulse train in which the delay time of each pulse follows the normal distribution of average 0 in the pulse generating block 150. The neuron 100 also generates an output signal $z_j'$ in which each pulse of the generated pulse train is delayed based on the result of arithmetic operation of the non-linear operating block 140 to output as the output signal of the neuron 100.

When a teacher signal t is inputted to the neuron 100 from the outside, the link weight updating block 160 updates the link weight $w_{ji}$ stored in the register of the multiplying block 120. The arithmetic operations in the link weight updating block 160 correspond to the operations of the expressions (6) and (7).

It is noted that although various signals are inputted to the link weight updating block 160, they are not shown in FIG. 17 to avoid the figure from becoming complex. The signals inputted to the link weight updating block 160 will be described later. Each of these blocks 120, 130, 140, 150 and 160 operates based on the signal from the reference pulse generating block 200. It is noted that a pulse train T is a reference pulse T similar to that in the first embodiment. Meanwhile, a pulse train S is outputted with respect to the predetermined number of reference pulses T.

While the neuron 100 has been explained roughly above in the unit of function blocks, the structure and operation of each block will be explained below in detail.

At first, the multiplying block 120 will be explained.

Figure 18:
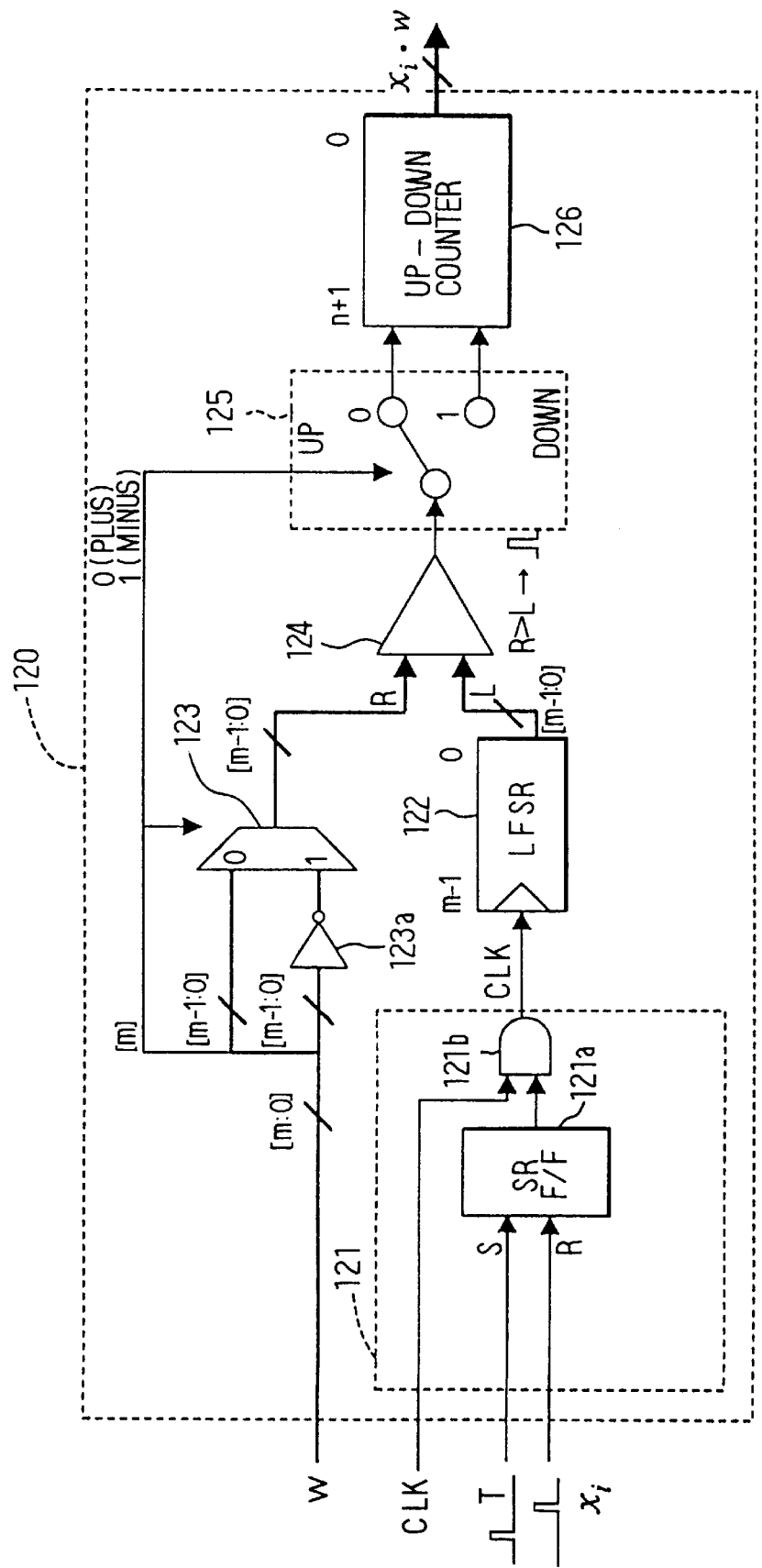
FIG. 18 is a circuit diagram illustrating a structure of a multiplying block of the second embodiment.

FIG. 18 is a circuit diagram showing the structure of the multiplying block 120. The multiplying block 120 comprises a delay time counting section 121, an LFSR 122 which is a uniform random number generator, an inversion switching section 123, a comparator 124, an up-down switch section 125 and an up-down counter 126.

Because the multiplying block 120 has almost the same structure with the multiplying block 20 in the first embodiment, only the parts different from that will be explained here.

The delay time counting section 121 comprises an SR flip-flop (hereinafter referred to as an "SRF/F") 121a and an AND gate 121b of two inputs.

An input signal $x_i$ is inputted to a reset terminal (R) of the SRF/F 121a and the reference pulse T is inputted to a set terminal (S). An output terminal of the SRF/F 121a is connected to one input terminal of the AND gate 121b. A clock signal (CLK) from the outside is inputted to another input terminal of the AND gate 121b. Then, an output terminal of the AND gate 121b is connected to a clock terminal of the LFSR 122.

The LFSR 122, the inversion switching section 123, the comparator 124, the up-down switch section 125 and the up-down counter 126 are constructed basically in the same manner with those in the first embodiment. However, the most significant bit [m] of the link weight w is inputted to the inversion switching section 123 and the up-down switching section 125.

When the most significant bit [m] of the link weight w is "0", the inversion switching section 123 changes over the switch to the "0" side. Meanwhile, when the most significant bit [m] is "1", the inversion switching section 123 changes over the switch to the "1" side. The link weight w is expressed by using the notation of 2's complement and when the switch is changed over to the "1" side, it is inverted by the inverting gate 123a and is inputted to the input terminal (R) of the comparator 124 as an absolute value. It is noted that although "1[ must be added, strictly speaking, after the inversion, the adding process is omitted also in the present embodiment in order to reduce the hardware.

When the most significant bit [m] of the link weight w is "0", the up-down switch section 125 changes over the switch to the "0" side or when it is "1", the up-down switch section 125 changes over the switch to the "1" side. Thereby, when the link weight w is expressed by the notation of 2's complement as a minus value, the up-down counter 126 counts down.

The operation of the multiplying block 120 constructed as described above will be explained below based on a circuit diagram in FIG. 18 and a timing chart in FIG. 19.

Figure 19:
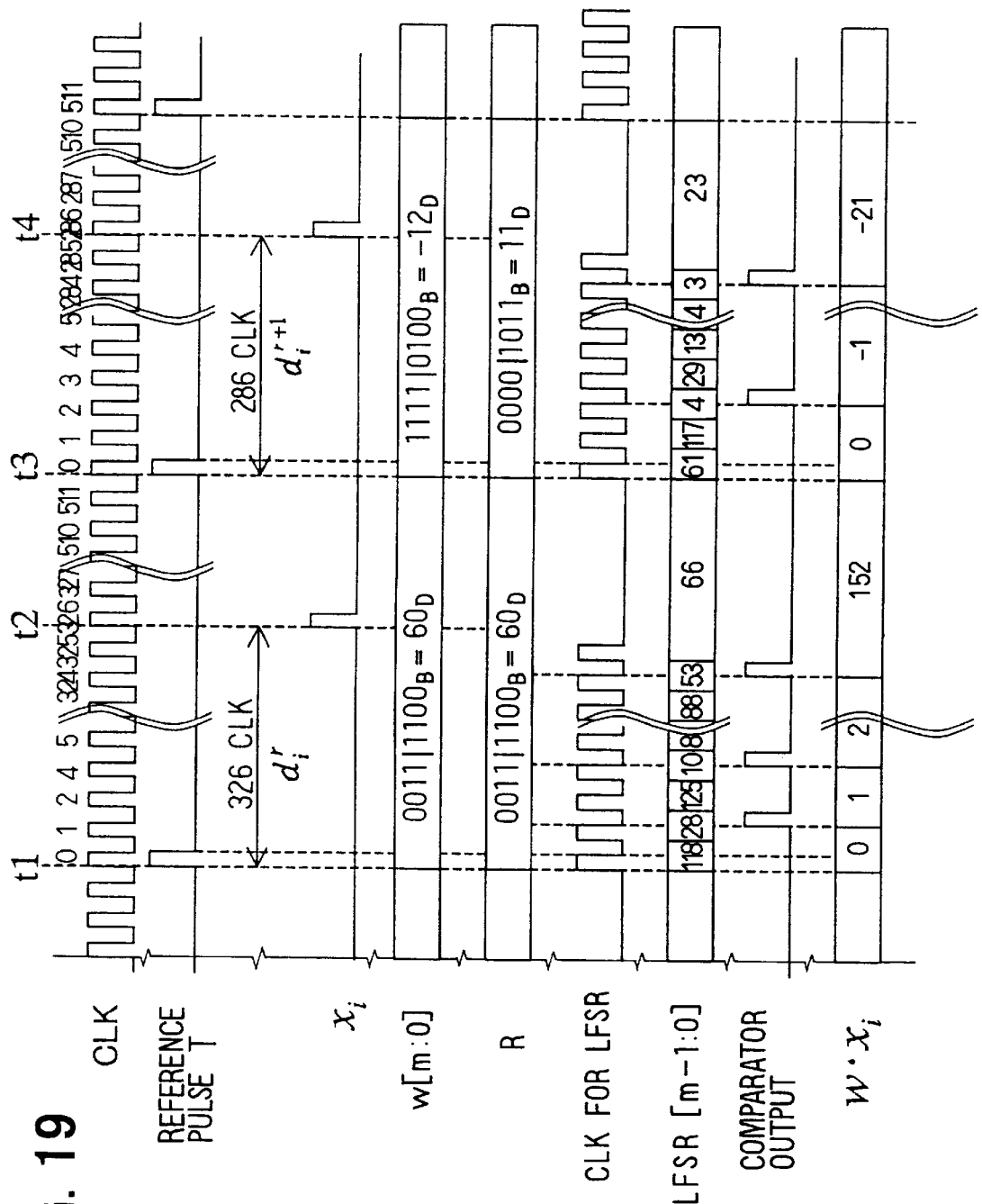
FIG. 19 is a timing chart illustrating operations of the multiplying block of the second embodiment.

When the reference pulse T is inputted to the SRF/F 121a at time t1 as shown in FIG. 19, an output of the SRF/F 121a is inverted to H level. Accordingly, the clock signal CLK is outputted from the AND gate 121b. As a result, the output of the clock signal operating the LFSR 122 is started.

Then, when a pulse of the input signal $x_i$ is inputted to the SRF/F 121a at time t2, the output of the SRF/F 121a is inverted to L level. Therefore, the output of the AND gate 121b is maintained at the L level and the output of the clock signal operating the LFSR 122 stops.

Accordingly, the clock signal to the LFSR 122 is outputted corresponding to the period of time t1 to t2, i.e. the delay time $d_i^x$ of the pulse, as shown in FIG. 19.

The following explanation will be continued while assuming that the sign of the link weight w is plus as shown in FIG. 19 and the link weight w (register w)=60.

When the link weight w using the notation of 2's complement is a plus value, the most significant bit [m] of the register of m+1 bits [m: 0] is "0". Accordingly, the inversion switching section 123 changes over the switch to the "0" side. Therefore, the numerical value of m bits [m−1: 0] except of the most significant bit [m] of the m+1 bit register is inputted to the R terminal of the comparator 124.

Because the most significant bit of the link weight is "0", the up-down switch section 125 changes over the switch to the "0" side. That is, it changes over the switch so that the output from the comparator 124 is inputted to the up-side terminal of the up-down counter 126.

It has been described above that the clock signal to the LFSR 122 is outputted in the period of time t1 to t2. The clock signal is outputted to the LFSR 122 during the period of time t1 to t2 as shown in FIG. 19. The LFSR 122 generates the random number r of m bits [m−1: 0] every time when the pulse is inputted as the clock signal. Then, this random number r is outputted to the L terminal of the comparator 124.

When the link weight w>random number r, the comparator 124 outputs a pulse to the up-down counter 126. Because there have been the case of the link weight w >random number r by 152 times in FIG. 19, the up-down counter 126 counts up to "152".

Meanwhile, the operation during the period from time t3 to t4 in FIG. 19 is the same with the operation during the period of time t1 to t2 described above. However, because the sign of the link weight w is minus and the link weight w (register w)=−12, the up-down switching section 125 changes over the switch to the "1" side. That is, it changes over the switch so that the output from the comparator 124 is inputted to the terminal of the down side of the up-down counter 126.

Therefore, the random number r is generated by the clock signal to the LFSR 122 corresponding to the delay time $d_1^{x+1}$ and the up-down counter 126 counts like "0"→"−1"→"−2"→"−3" by the pulse output of the comparator 124. The up-down counter 126 counts up to "−21" in FIG. 19.

Thereby, when the link weight is a minus value, it means that the delay time has converted into the minus numerical value in the multiplying block 120.

Here, the set of the output values of the up-down counter 126 of the multiplying block 120, i.e., the distribution of numerical values of "152" corresponding to the delay time $d_1^x$ and "−21" corresponding to the delay time $d_1^{x+1}$, are normal distribution of N(wx, 1). It is because the multiplying block 120 is what the approximation of normal distribution of binomial distribution is applied in the same manner with the first embodiment.

Next, the adding block 130 will be explained.

Figure 20:
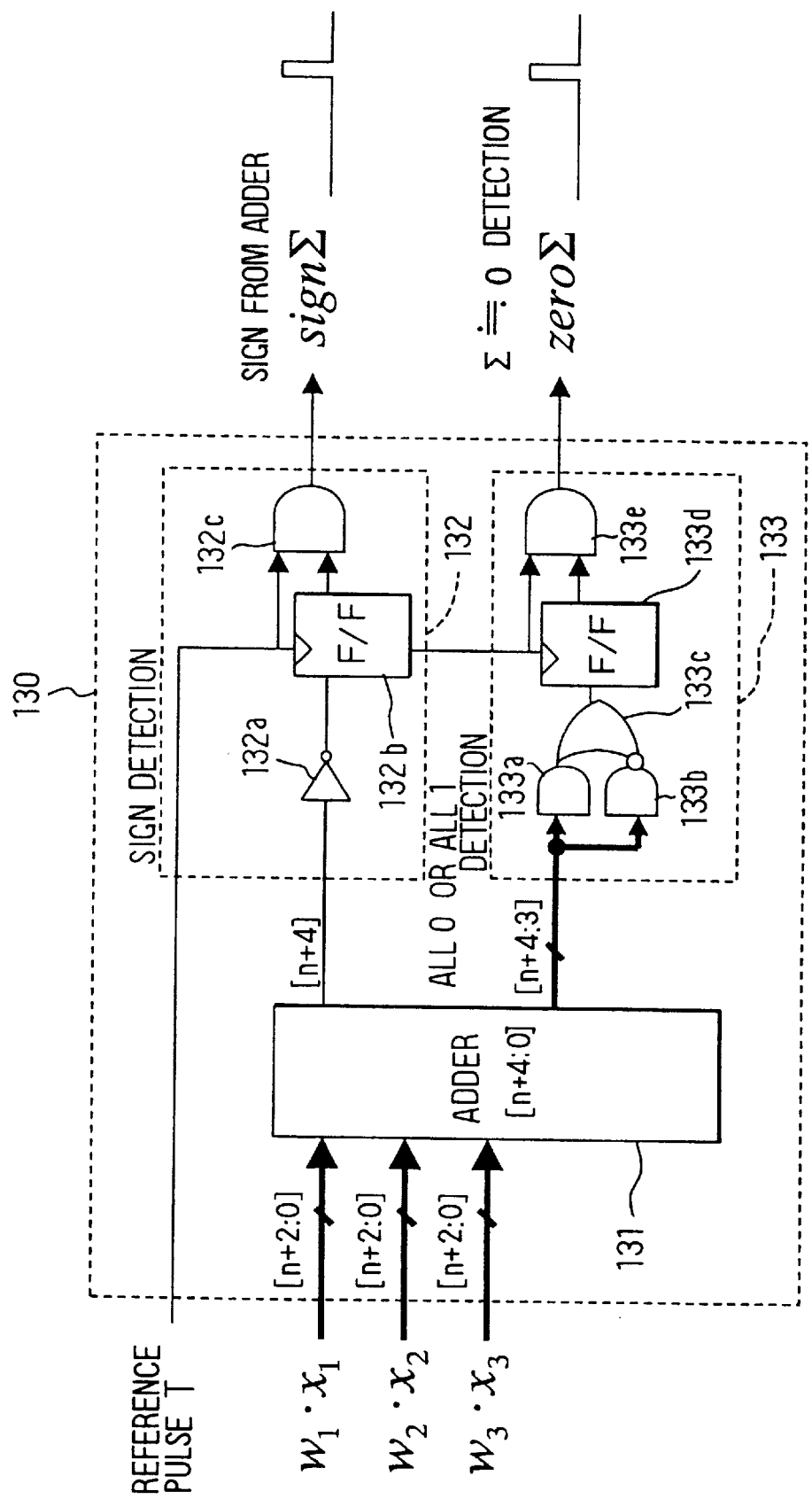
FIG. 20 is a circuit diagram illustrating a structure of an adding block of the second embodiment.

FIG. 20 is a circuit diagram showing the structure of the adding block 130. The adding block 130 comprises an adder 131, a sign detecting section 132 and a zero detecting section 133.

The adder 131 is n+5 bits [n+4: 0]. An output value w·x from the up-down counter 126 of each multiplying block 120 is outputted to the adder 131. The output values from the respective multiplying blocks 120 shown in FIG. 17 will be described as $w_1 \cdot x_1$, $w_2 \cdot x_2$ and $W_3 \cdot X_3$. The output value w·x is represented by the notation of 2's complement, so that the most significant bit [n+2] is a sign bit.

The sign detecting section 132 comprises an inverting gate 132a, a flip-flop (hereinafter referred to as an "F/F") 132b and an AND gate 132c of two inputs.

The most significant bit [n+2] of the adder 131 is inputted to the inverting gate 132a. An output terminal of the inverting gate 132a is connected to an input terminal of the F/F 132b. The reference pulse T is inputted to a clock terminal of the F/F 132b. The reference pulse T is also inputted to one input terminal of the AND gate 132c. An output terminal of the F/F 132b is connected to another input terminal of the AND gate 132c. An output signal of the AND gate 132c is outputted to the outside as a pulse signal signΣ. Here, the output of the AND gate 132c is the sign of the result of addition of the adder 131. It is noted that the clock signal CLK has been inputted from the outside to the clock terminal of the F/F 32b in the sign detecting section 32 in the first embodiment (see FIG. 6), the outputted signal is the same.

The zero detecting section 133 is a component which does not exist in the first embodiment. It is a component for detecting that the result of addition of the adder 131 is equalized almost to "0" and generates a pulse signal used for controlling learning described later. The zero detecting section 133 comprises an AND gate 133a of n+2 inputs, an NAND gate 133b of n+2 inputs, an OR gate 133c of two inputs, an F/F 133d and an AND gate 133e of two inputs.

The host n+2 bits [n+4: 3] of the adder 131 is inputted to input terminals of n+2 of the AND gate 133a and the NAND gate 133b. Output terminals of the both gates 133a and 133b are connected respectively to two input terminals of the OR gate 133c. Then, an output terminal of the OR gate 133c is connected to an input terminal of the F/F 133d. The reference pulse T is inputted to a clock terminal of the F/F 133d and one input terminal of the AND gate 133e of the two inputs. An output terminal of the F/F 133d is connected to another input terminal of the AND gate 133e.

The operation of the adding block 130 constructed as described above will be explained below based on the circuit diagram in FIG. 20 and a timing chart in FIG. 21.

The output values w·x from the respective multiplying blocks 120 are inputted to the adder 131 as described above. The adder 131 adds those strings of numerical values of the same string outputted from the respective multiplying blocks 120 in the time series manner. See the column indicated as "Adder" in FIG. 21.

The most significant bit [n+4] of the adder 131 is inputted to the sign detecting section 132 as shown in FIG. 20. The most significant bit of the adder 131 is inputted to the F/F 132b via the inverting gate 132a. Accordingly, when the result of addition is plus, the output terminal of the F/F 132b turns to H level "1" and when it is minus in contrary, the output terminal of the F/F 132b turns to L level "0". Then, when the reference pulse is inputted, the output of the F/F 132b becomes the output of the AND gate 132c.

Figure 21:
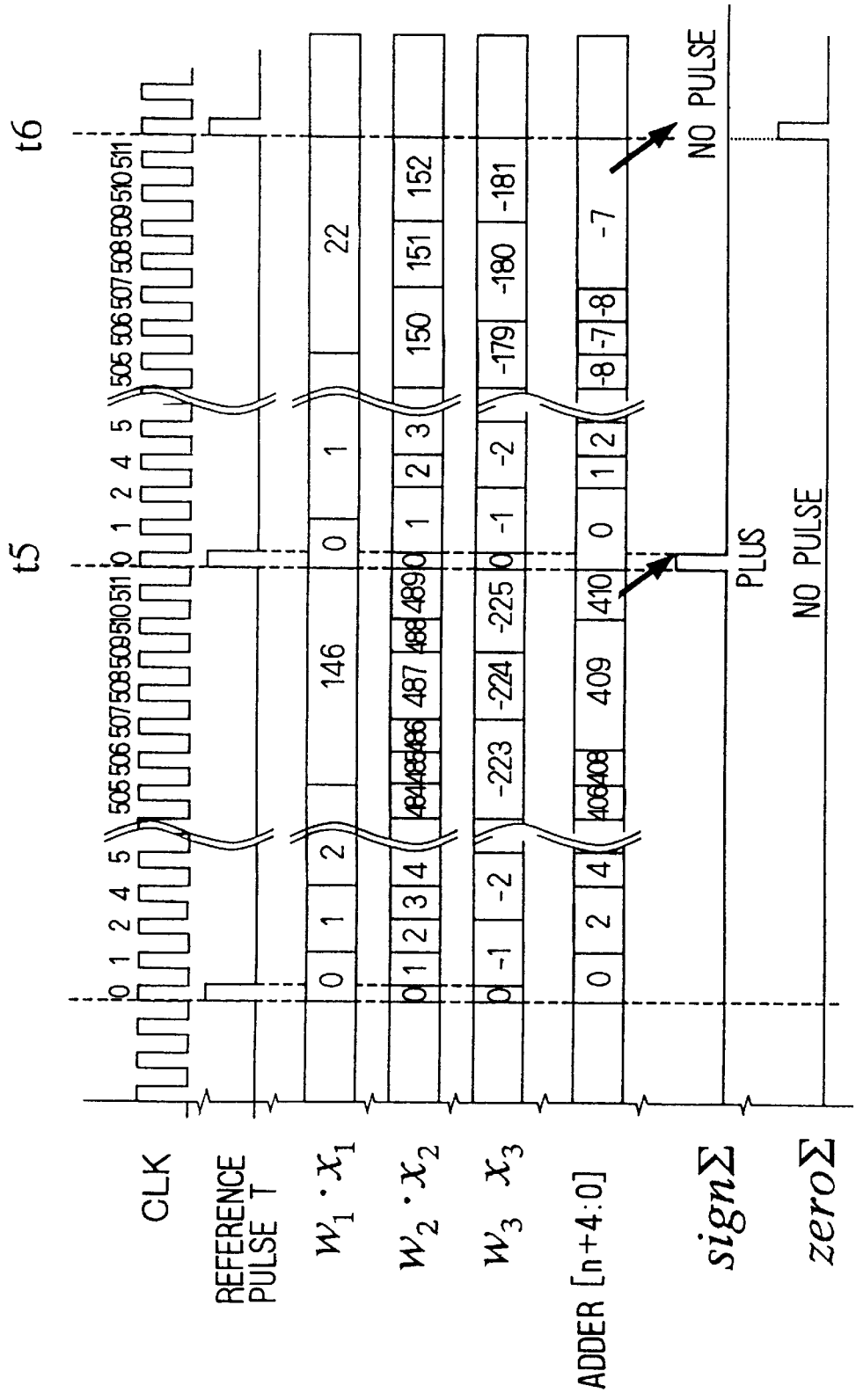
FIG. 21 is a timing chart illustrating operations of the adding block of second embodiment.

That is, because the result of addition of the adder 131 is "410" (plus) just before time t5, a pulse indicative of that the result of addition Σw·x is plus is outputted from the AND gate 132c when the reference pulse is inputted at time t5 as indicated a black arrow in FIG. 21. Meanwhile, because the result of addition of the adder 131 is "−7" (minus) just before time t6, no pulse is outputted from the AND gate 132c even if the reference pulse is inputted at time t6.

In the zero detecting section 133, an output of the OR gate 133c turns to "1" when all the high order n+2 bits of the adder become "0" or "1". It is a case when the absolute value of the result of addition is "7" or less.

When the output of the OR gate 133c becomes an output of the F/F 133d and the reference pulse is inputted, the output of the F/F 133d becomes an output of the AND gate 133e. Accordingly, because the result of addition of the adder 131 is "−7" just before time t6 in FIG. 21, a pulse is outputted at time t6.

Next, the non-linear operating block 140 will be explained.

Figure 22:
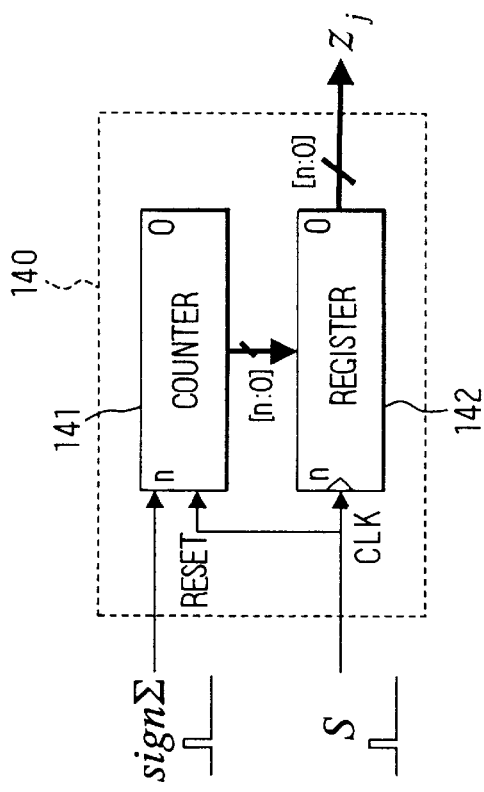
FIG. 22 is a circuit diagram illustrating a structure of a non-linear operating block of second embodiment.

FIG. 22 is a circuit diagram showing the structure of the non-linear operating block 140. The non-linear operating block 140 comprises a counter 141 of n+1 bits [n: 0] and a register 142 of n+1 bits [n: 0]. A pulse signal signΣ is inputted to an input terminal of the counter 141 from the sign detecting section 132 of the adding block 130 described above. This signal is outputted when the result of addition of the adding block 130 is a positive value at the point of time when the reference pulse is inputted to the adding block 130 as described above.

Accordingly, the counter 141 counts a number of positive values within the result of addition. A numerical value of n+1 bits [n: 0] which is a counted value of the counter 141 is held in the register 142 at the timing when the pulse S which becomes the clock signal of the register 142 is inputted and becomes an output value $z_j$ of the non-linear operating block 140.

The distribution of the added values in the adding block 130 is a normal distribution of $N(\Sigma w_{ji} x_i, 1)$ in the same manner with the first embodiment. That is, the distribution of added values turns out as shown in FIG. 9 and the output value $z_j$ of the register 142 of the non-linear operating block 140 corresponds to the number of positive values within the added value (delay time from each T) within FIG. 9, i.e., to the hatched domain.

Figure 23:
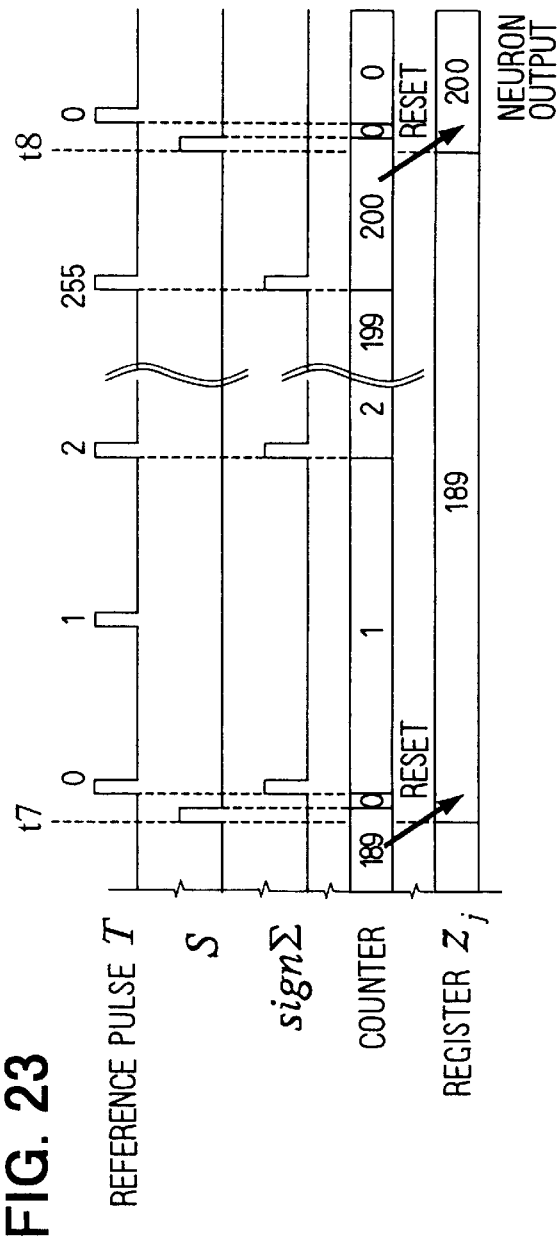
FIG. 23 is a timing chart illustrating operations of the non-linear operating block of second embodiment of second embodiment.

The operation of the non-linear operating block 140 constructed as described above will be explained based on the circuit diagram in FIG. 22 and a timing chart in FIG. 23.

According to the present embodiment, one pulse S is outputted with respect to 256 reference pulses T from the reference pulse generating block 200 described later. When the reference pulses are denoted by numbers "0", "1", "2", ..., "255" for the purpose of explanation, the pulse S is outputted at the timing just before the "0-th" reference pulse T as shown in FIG. 23. Accordingly, the output value $z_j$ is what is obtained by counting pulses of the pulse signal signΣ corresponding to the reference pulses of the "0-th" to "255-th" reference pulses. For instance, a count "189" of the counter 141 at the point of time when the pulse S is inputted at time 7 is held in the register 142 and becomes the output value $z_j$ in FIG. 23. Acount "200" of the counter 141 at the point of time when the pulse S is inputted at time t8 is held in the register 142 and becomes the output value $z_j$.

It is noted that the non-linear operating block 140 comprises the counter 141 and the register 142 in the second embodiment to hold the count value at the inputting timing of the pulse S to clearly show the output value $z_j$ of the non-linear operating block 140. However, the count value may be outputted as it is by composing the non-linear operating block 140 only by the counter 141 in the same manner with the non-linear operating block 40 in the first embodiment (see FIG. 8).

Figure 24:
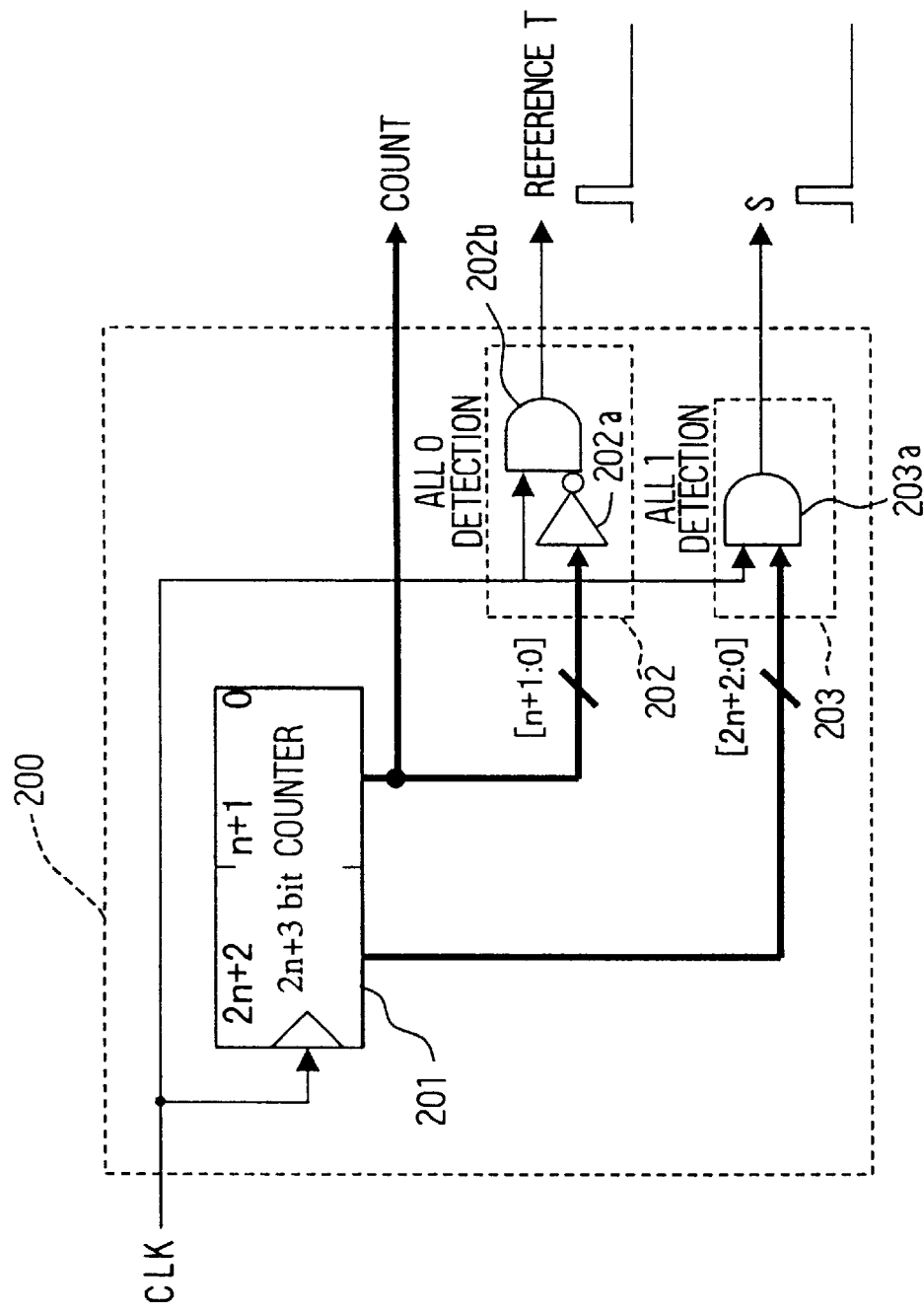
FIG. 24 is a circuit diagram illustrating a structure of a reference pulse generating block of the second embodiment.

Next, the reference pulse generating block 200 will be explained. FIG. 24 is a circuit diagram showing the structure of the reference pulse generating block 200. The reference pulse generating block 200 comprises a counter 201 of 2n+3 bits [2n+2: 0], an ALL0 detecting section 202 and an ALL1 detecting section 203.

A clock signal (CLK) is inputted from the outside to the reference pulse generating block 200 as a clock signal of the counter 201. Accordingly, the counter 201 counts repeatedly from "0" to "$2^{2n+3}-1$" in synchronism with the clock signal (CLK).

The ALL0 detecting section 202 comprises an inverting gate 202a of n+2 inputs and an AND gate 202b of two inputs. The low order n+2 bits [n+1: 0] of the counter 201 is inputted to the n+2 input terminals of the inverting gate 202a. Then, an output terminal of the inverting gate 202a is connected to one input terminal of the AND gate 202b. The external clock signal (CLK) is inputted to the other input terminal of the AND gate 202b. Accordingly, the output of the inverting gate 202a turns to "1" all of the low order n+2 bits [n+1: 0] of the counter 201 turn to "zero". The output of the inverting gate 202a is outputted from the AND gate 202b at the input timing of the external clock signal (CLK). The signal outputted from the ALL0 detecting section 202 is the reference pulse T described above.

Meanwhile, the ALL1 detecting section 203 comprises an AND gate 203a of 2n+4 inputs. 2n+3 bits (2n+2: 0] of the counter 201 as well as the external clock signal (CLK) are inputted to the 2n+4 input terminals of the AND gate 203a, respectively. Accordingly, the output of the AND gate 203a turns to "1" when all of the 2n+3 bits of the counter 201 turn to "1" at the input timing of the external clock signal (CLK). The signal outputted from the ALL1 detecting section 203 is the pulse S described above.

Next, the pulse generating block 150 will be explained.

Figure 25:
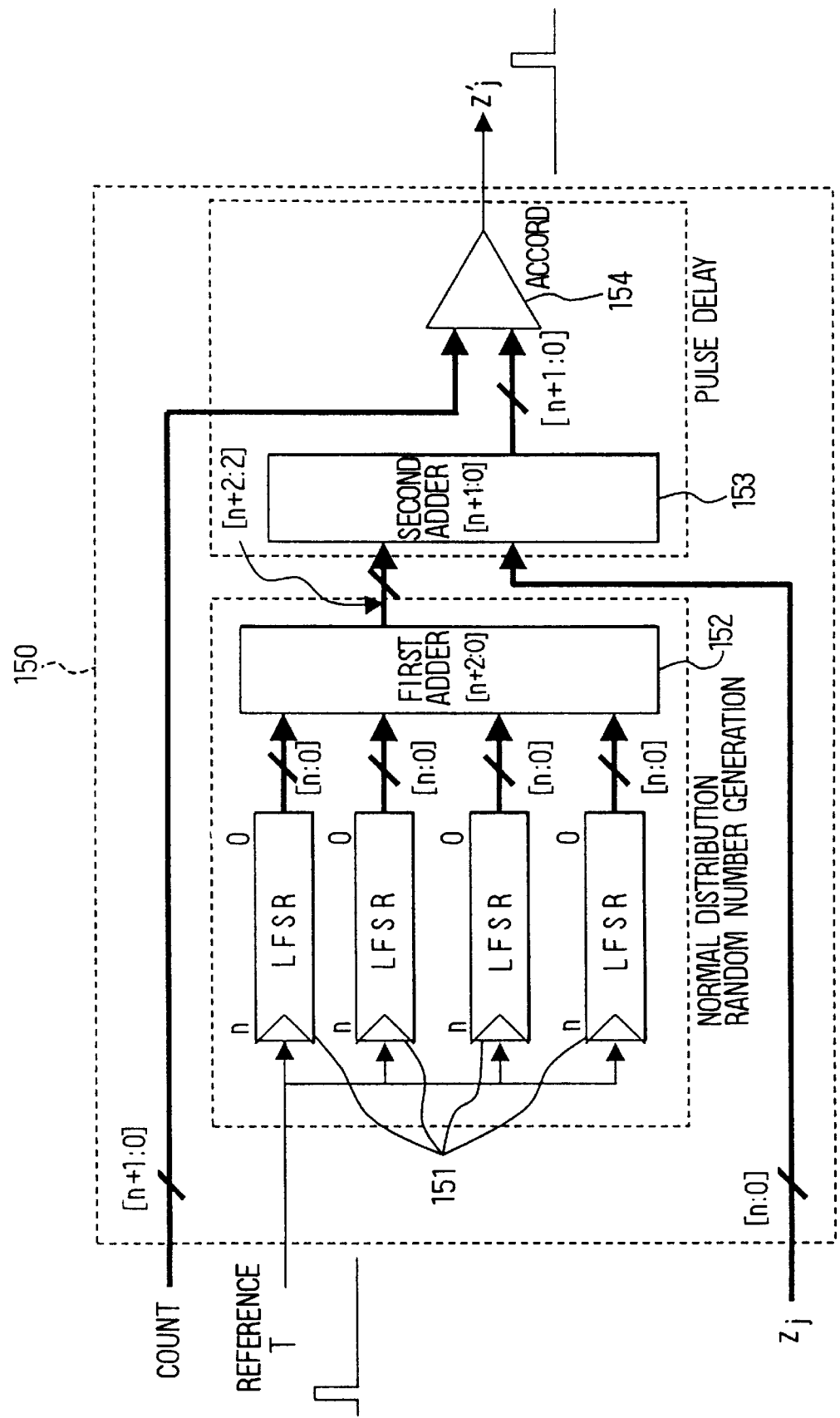
FIG. 25 is a circuit diagram illustrating a structure of a pulse generating block of the second embodiment.

FIG. 25 is a circuit diagram showing the structure of the pulse generating block 150. The pulse generating block 150 comprises four LFSRs 151 which are uniform random number generators, a first adder 152, a second adder 153 and a comparator 154.

The reference pulse T is inputted to clock terminals of the four LFSRs 151. When the pulse is inputted to the clock terminal, the LFSR 151 generates random numbers of n+1 bits [n: 0]. Accordingly, each LFSR 151 generates a numerical value within the range of 1 to 225 ($2^8-1$) at random if n=7.

The first adder 152 adds the random numbers generated by the respective LFSRs 151. Then, the second adder 153 adds the high order n+1 bits [n+2: 2] of the first adder 152 and the output value $z_j$ of the non-linear operating section 140. Then, the result of addition of n+2 bits [n+1: 0] of the second adder 153 is outputted to one input terminal of the comparator 154. Low order n+2 bits [n+1: 0] of the counter 201 of the reference pulse generating block 200 (see FIG. 24) is inputted to the other input terminal of the comparator 154. When the numerical values of n+2 bits inputted to the both input terminals coincide, the comparator 154 outputs a pulse. The signal from this comparator 154 is an output value $z_j'$.

Figure 26:
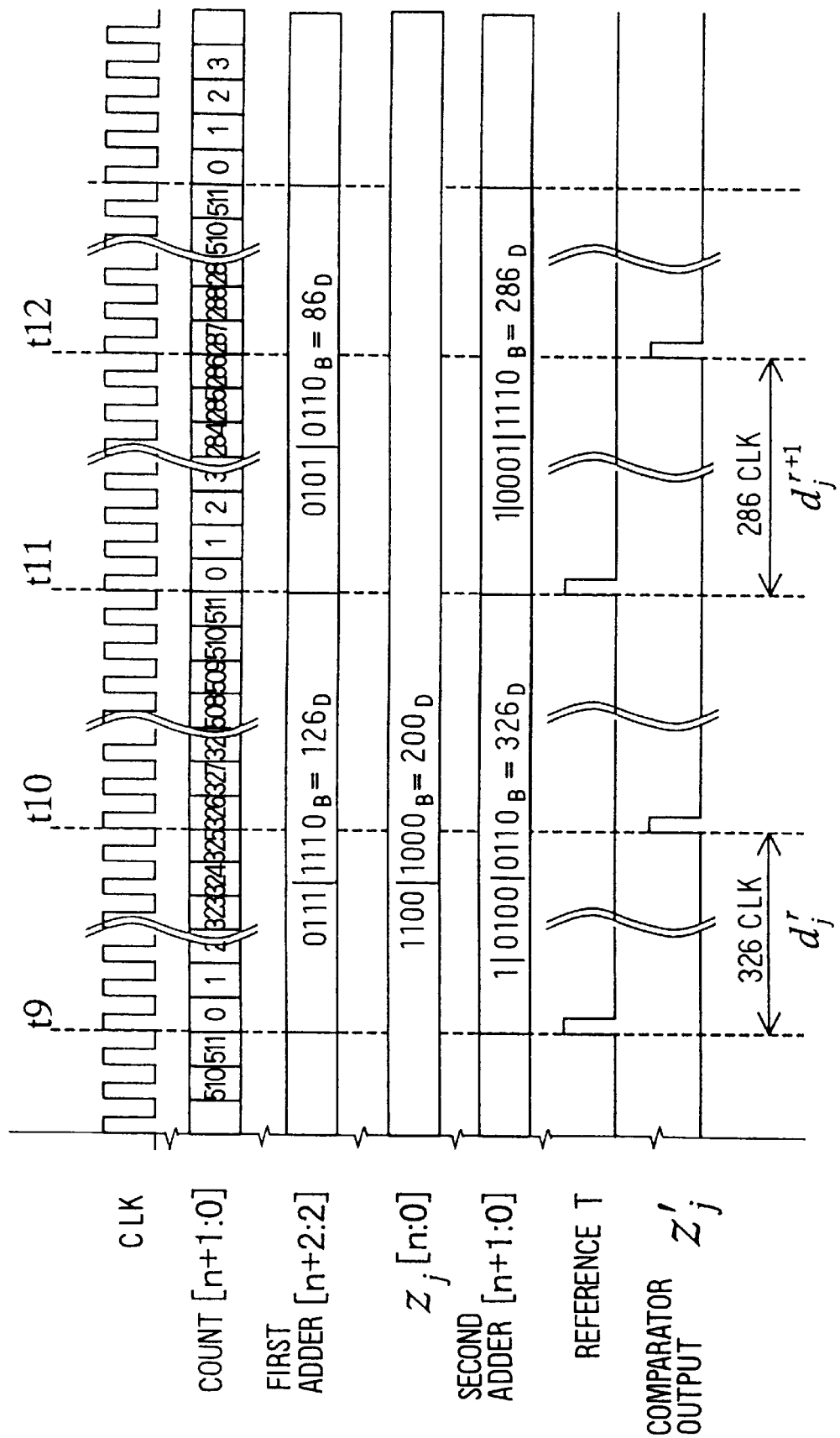
FIG. 26 is a timing chart illustrating operations of the pulse generating block of the second embodiment.

The operation of the pulse generating block 150 constructed as described above will be explained below based on the circuit diagram in FIG. 25 and a timing chart in FIG. 26. The timing chart shown in FIG. 26 shows the case when n in the circuit diagram in FIG. 10 is "7". Accordingly, the following explanation will be given by assuming as n=7 continuously.

Because the reference pulse T is inputted when the count of n+2 bits becomes "0" (at times t9 and t11 in FIG. 26), the four LFSRs 151 output the random numbers of 1 to 255 to be inputted to the first adder 152. Accordingly, while the value added by the first adder 152 turns out to be a random numerical value of 4 to 1020 (=255×4), a random numerical value from 1 to 255 is inputted to the second adder 153 because the output of the first adder 152 is high order 8 bits [9: 2]. That is, the value obtained by dividing the added value by 4 is inputted to the second adder 153 as the result of addition. The distribution of the random numerical values follows the normal distribution by the central limit theorem as described above.

For instance, FIG. 26 shows cases when the value obtained by dividing the result of addition of the first adder 152 by 4 is "126" at time t9 and is "86" at time t11. At this time, the output value $z_j$ of the non-linear operating block 140 is "200".

Accordingly, the result of addition of the second adder 153 is "326" at time t9 and "286" at time t11. The result of addition is inputted to one input terminal of the comparator 154.

The count of 0 to 511 is inputted to the other input terminal of the comparator 154. Accordingly, the comparator 154 outputs the pulse at the point of time when the count is "326" (at time t10 in FIG. 26) outputs the pulse at the point of time when the count is "286" (at time t12).

Accordingly, the pulse outputted from the comparator 154 at time t10 delays behind the reference pulse T outputted at time t9 by time $d_j^r$ (by 326 clocks). The pulse $z_j'$ outputted from the comparator 154 at time t12 delays behind the reference pulse T outputted at time t11 by time $d_j^{r+1}$ (by 286 clocks).

When an average of the delay time of each pulse outputted from the comparator 154 from the respective reference pulses T is assumed to be $z_j$, the distribution of the delay times follows the normal distribution of $N(z_j, 1)$.

That is, when a large number random numbers whose distribution is finite are added, it approaches to the normal distribution by the central limit theorem as described in the first embodiment. Therefore, the distribution of result of addition of the adder 152 almost follows the normal distribution in the present embodiment. Further, the pulse is delayed by $z_j$ by adding the output value $z_j$ of the non-linear operating block 140 to the normal distribution of the result of addition. Accordingly, the distribution of the delay time $d_j$ of each pulse of the pulse train $z_j'$ follows the normal distribution of $N(z_j, 1)$.

Then, the pulse train $z_j'$ from the pulse generating block 150 is outputted to the outside as the output value of the j-th neuron 100.

FIG. 31 illustrates the distribution of occurrence of the output pulse train $z_j'$ in the pulse generating block 150 shown in FIG. 25. The horizontal axis represents the input value $z_j$ and the vertical axis represents the distribution of occurrence of the $z_j'$. FIG. 31 shows a case when $z_j$=200, a number of pulses is 20,000 and n=7. It is apparent from FIG. 31 that the distribution of occurrence presents the normal distribution whose average value is $z_j+(2^n-1)$.

It is noted that although the pulse train $z_j'$ was generated by generating the pulse train x0 following the normal distribution of N(0, 1) by the basic pulse generating block 50 shown in FIG. 3 and by delaying the pulse train x0 in accordance to the result $z_j$ of the non-linear operating block 40 by the pulse delaying block 60 in the first embodiment, such processes are carried out by the pulse generating block 150 altogether in the present embodiment.

Next, the link weight updating block 160 will be explained. It is noted that the neuron 100 described above has been explained as the j-th neuron which composes the intermediate layer illustrated in FIG. 15. However, the signals inputted to the link weight updating block 160 differ when the neuron 100 is the structural unit of the intermediate layer and of the output layer. Accordingly, the operation of the link weight updating block 160 provided in the j-th neuron 100 (hereinafter referred to as a "neuron j") of the intermediate layer will be explained separately from that of the link weight updating block 160 provided in the k-th neuron 100 (hereinafter referred to as a "neuron k") of the output layer only in this explanation of the link weight updating block 160. Further, the i-th neuron in the input layer will be described as a neuron i.

The structure of the link weight updating block 160 will be explained at first.

The link weight updating block 160 comprises five multipliers 161 and 162 of A through E, a counter 163 of n+1 bits [n: 0], a comparator 164, an inversion switching section 165, an inverting gate 166 and a subtractor 167. It is noted that while the structure of the five multipliers 161 and 162 of A through E will be described later, the four multipliers 161 of A through D are denoted by the same reference numerals because they have the structure.

A link weight $w_k$ of the neuron k and a pulse signal zero$\Sigma_j$ outputted from the adding block 130 of the neuron j are inputted to the A multiplier 161. An output terminal of n+2 bits [n+1: 0] of the A multiplier 161 is connected to one input terminal of the B multiplier 161. Then, a pulse signal presenting an output signal a from the neuron i is inputted to the other input terminal of the B multiplier 161. Then, output data of n+3 bits [n+2: 0] of the B multiplier 161 is inputted to one input terminal of the E multiplier 162. The most significant bit [n+2] of the output data of the B multiplier 161 is inputted to the E multiplier 162 as a sign bit.

The reference pulse T is inputted to a clock terminal of the counter 163. Then, a counted value of the counter 163 based on the reference pulse T is inputted to one input terminal (C) of the comparator 164.

A teacher signal t of n+1 bits [n: 0] and a value $z_k$ of non-linear operation from the non-linear operating block 140 of the neuron k are inputted to the subtractor 167. An output terminal of the subtractor 167 is connected to one input terminal of the C multiplier 161. Then, a pulse signal zero$\Sigma_k$ from the adding block 130 of the neuron k is inputted to the other input terminal of the C multiplier 161. An output terminal of n+2 bits [n+1: 0] of the C multiplier 161 is connected to one input terminal of the D multiplier 161 and to the other input terminal (S) of the comparator 164 described above via the inversion switching section 165. The most significant bit [n+1] of the output data of the C multiplier 161 is inputted to the inversion switching section 165 and the E multiplier 162. Further, the pulse signal sign$\Sigma_j$ from the adding block 130 of the neuron j is inputted to the other input terminal of the D multiplier 161 described above.

When the most significant bit [n+1] of the output data of the C multiplier 161 is "0" (plus), the inversion switching section 165 changes over the switch to the "0" side. Meanwhile, when the most significant bit is "1" (minus), it changes over the switch to the "1" side. When the switch is changed over to the "1" side, the output data from the c multiplier 161 is inverted by the inverting gate 166 and is inputted to the comparator 164. That is, an absolute value of the output data of the C multiplier 161 is inputted to the comparator 164. It is noted that although it is necessary, strictly speaking, to add "1" after inverting the bit, no adding process is carried out to reduce the circuit similarly to the multiplying block 120 described above.

The counted value of the counter 163 is inputted to one input terminal (C) of the comparator 164 as described above. Then, when the absolute value of the output data from the C multiplier 161 becomes greater than the counted value of the counter 163 (input terminal S>input terminal C), the comparator 164 outputs a pulse signal to the other input terminal of the E multiplier 162.

The E multiplier 162 outputs update data $\Delta w_j$ of the link weight $w_j$ of the neuron j. Mean while, the D multiplier 161 outputs update data $\Delta w_k$ of the link weight $w_k$ of the neuron k. After that, although not shown in the figure, an amount of update data $\Delta w$ is added to the link weight w to update the link weight w in the circuit within the link weight updating block 160.

Next, the structure of the A through D multipliers 161 will be explained based on FIG. 28 and that of the E multiplier 162 will be explained based on FIG. 29.

Both of the A through D multipliers 161 and the E multiplier 162 comprise mainly an LFSR which is a uniform random number generator, an inversion switching section, a comparator, an up-down switching section and an up-down counter similarly to the multiplying block 120 described above. Their connection is also the same and an absolute value of data inputted via the inversion switching section and output data of the LFSR are inputted to the comparator. Then, an output of the comparator is inputted to the up-down counter via the up-down switching section to be counted up or down.

Figure 28:
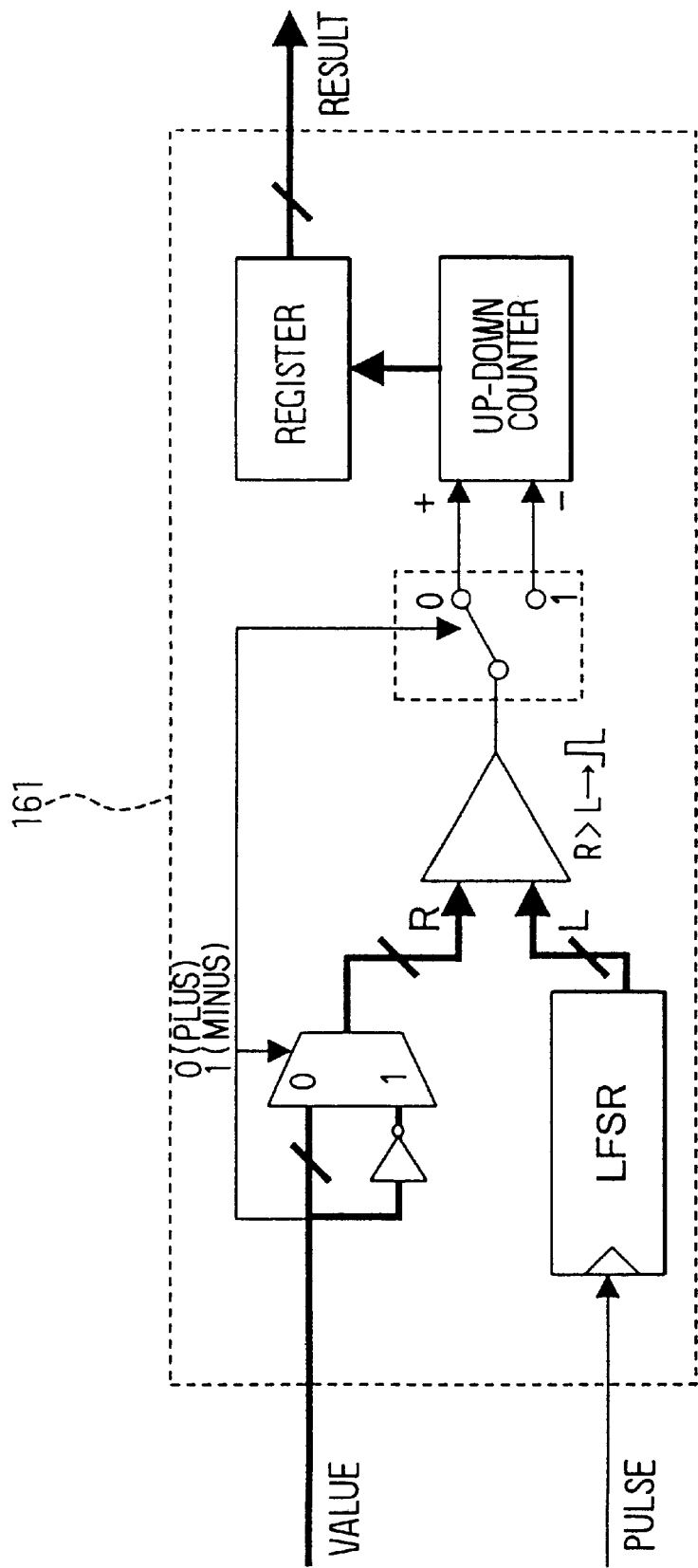
FIGS. 28 and 29 are circuit diagrams each of which illustrating a structure of multiplier of the link weight updating block of the second embodiment.
Figure 29:
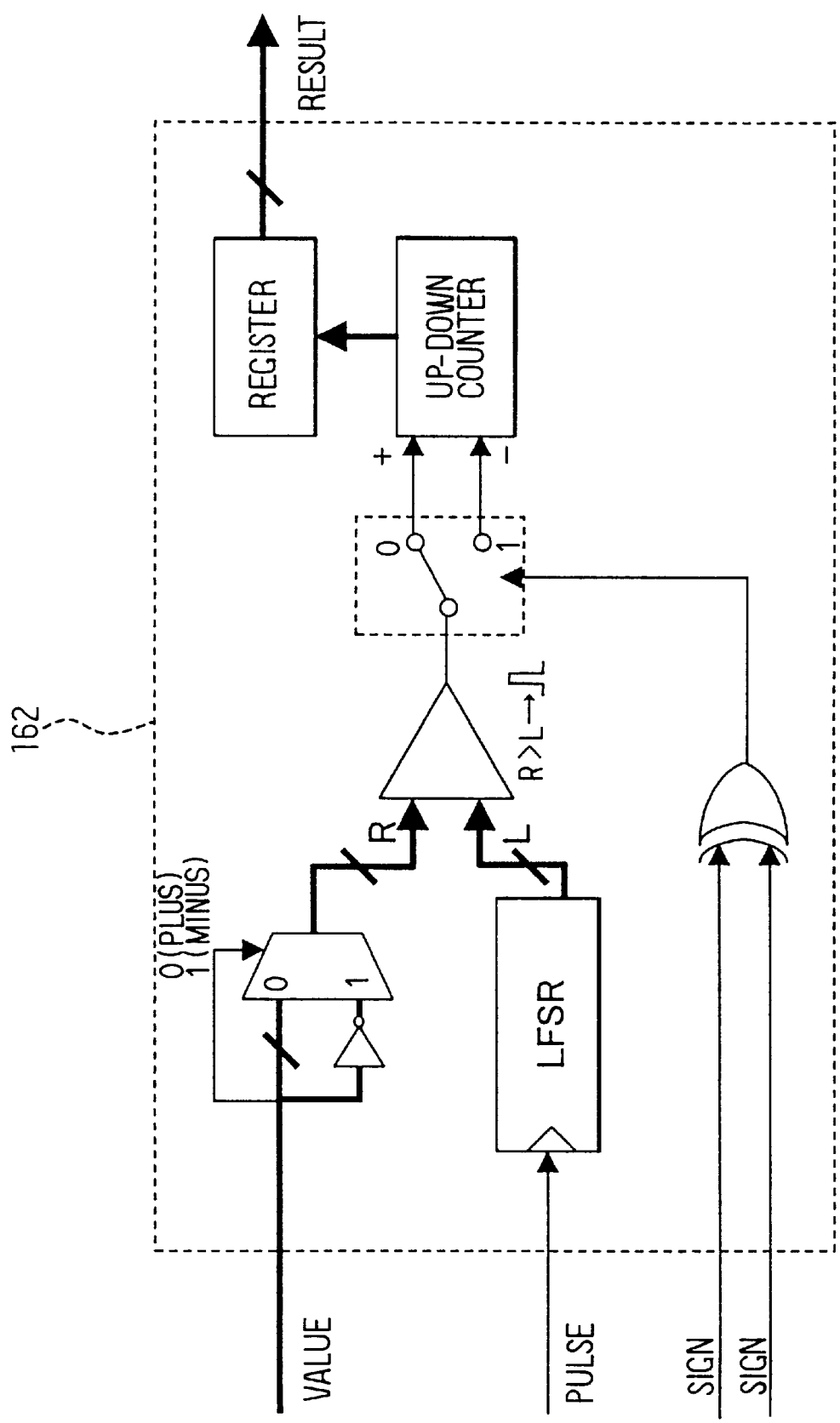

While the multipliers 161 and 162 carry out the multiplication of two signals, one signal is inputted in a form in which a signal value is converted into a pulse signal (indicated as "pulse" in FIGS. 28 and 29). Then, the multiplication is carried out by applying the approximation of normal distribution of binominal distribution.

The A through D multipliers 161 are different from the E multiplier 162 in that whether or not the sign of the pulse signal ("pulse") is taken into consideration. Because only one input signal indicated as "value" in the figure may take a minus value in the A through D multipliers, the up-down switching section changes over the switch to the "0" side or the "1" side depending on whether the most significant bit of the input signal is "0" or "1". Mean while, because the respective one of two input signals may take a minus value in the E multiplier 162, it is provided with an XOR gate to change over the switch to the "0" side when the most significant bit of the both input signals are "0" or "1" to change over the switch to the "1" side otherwise.

The, the counted value of the up-down counter of the multipliers 161 and 162 are held in the registers at the timing when the pulse signal S is inputted from the outside not shown and become output data ("result").

The operation of the link weight updating block 160 constructed as described above will be explained based on a circuit diagram in FIG. 27 and a timing chart in FIG. 30.

Figure 30:
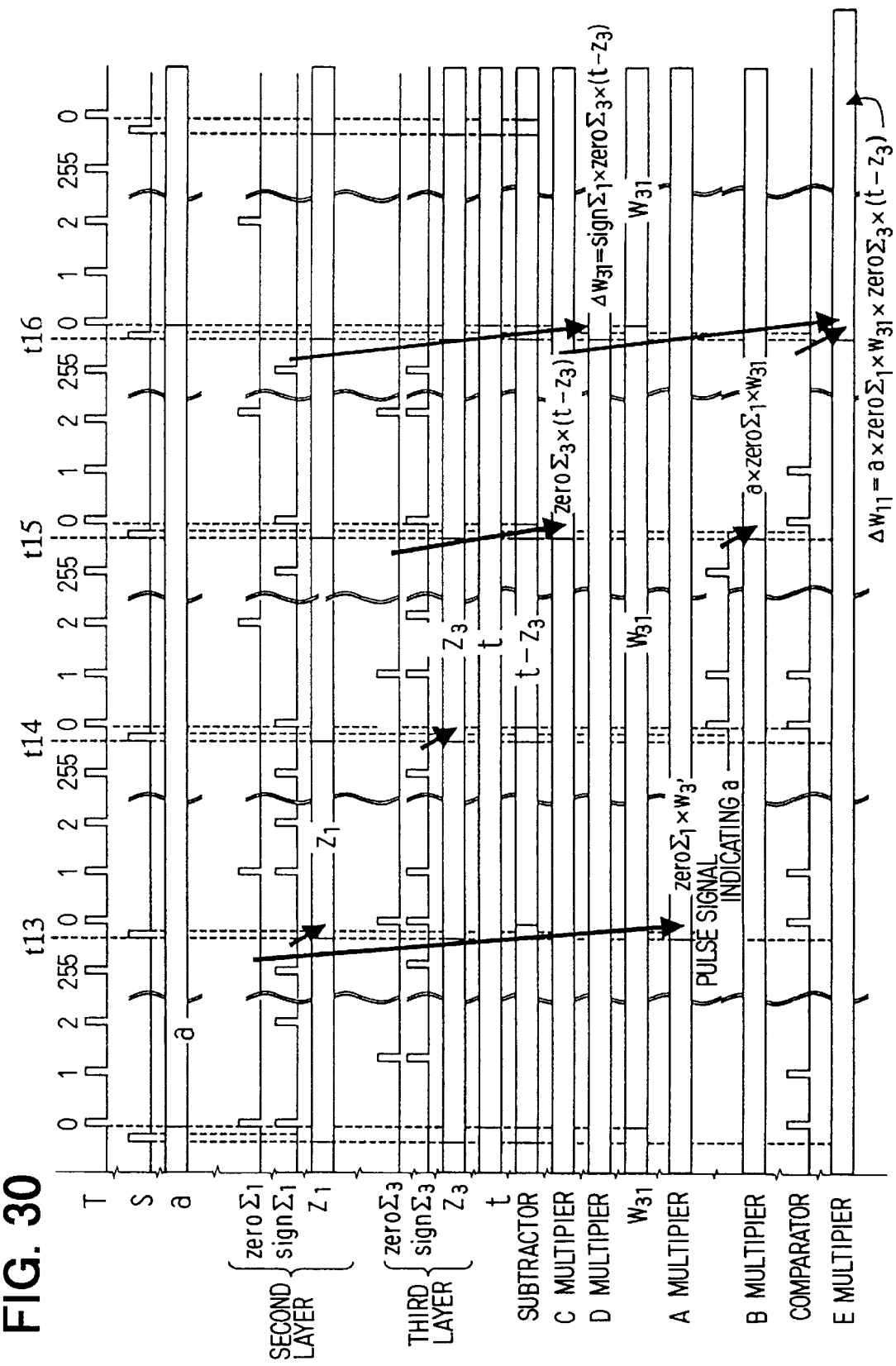
FIG. 30 is a timing chart illustrating operations of the link weight updating block of the second embodiment.

In FIG. 30, (a) denotes an output signal of a neuron (it is not a neuron strictly speaking) of the first layer, (zero$\Sigma_3$, sign$\Sigma_1$) pulse signals from the adding block 130 of the neuron j of the second layer and ($z_1$) a value of non-linear operation of the non-linear operating block 140, respectively. (zero$\Sigma_1$, sign$\Sigma_3$) denote pulse signals from the adding block 130 of the neuronk of the third layer and ($z_3$) a value of non-linear operation of the non-linear operating block 140. Further, ($W_{31}$) denotes a link weight of the neuron j and the neuron k.

(1) In Case of Neuron j

Figure 27:
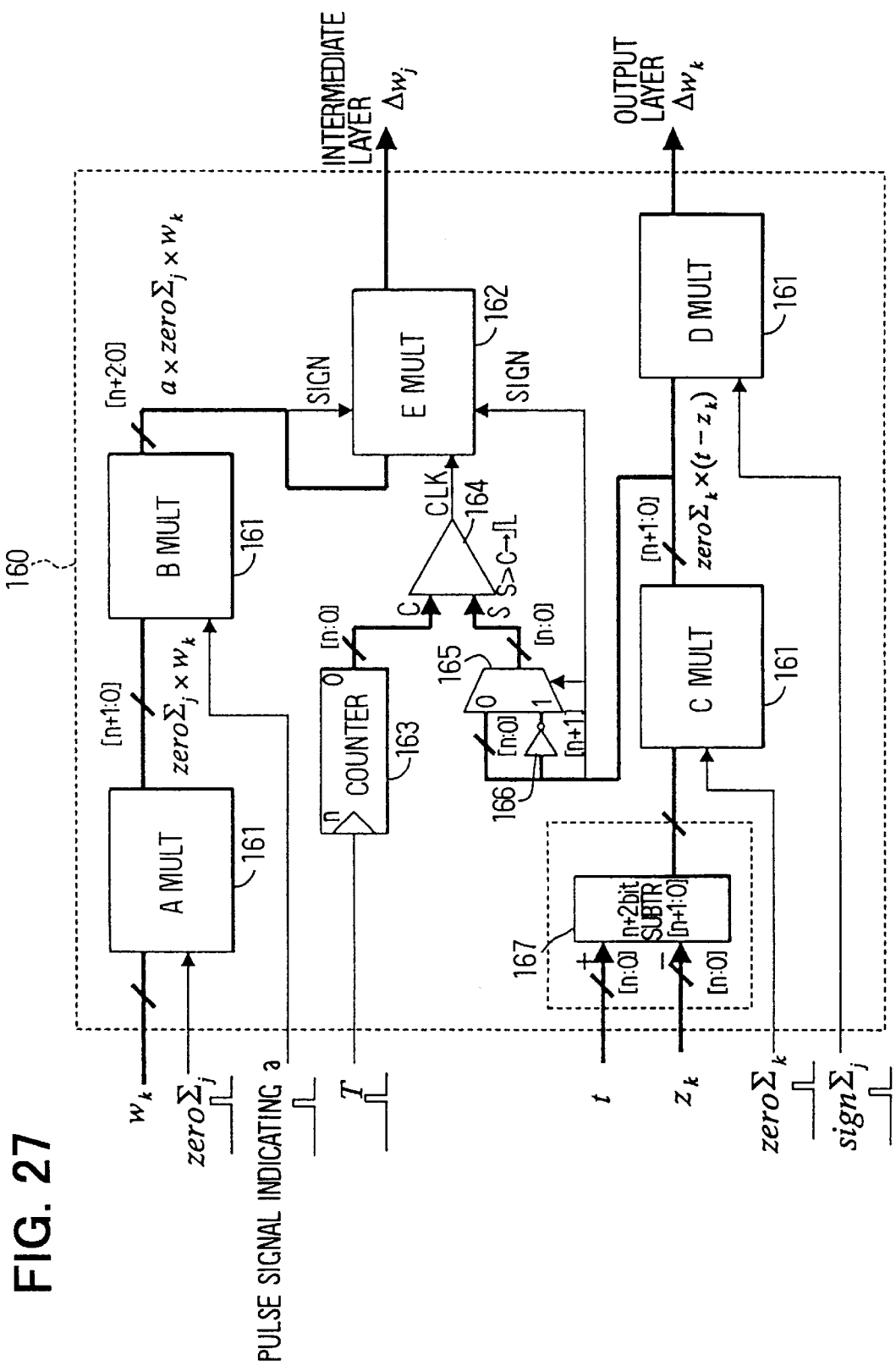
FIG. 27 is a circuit diagram illustrating a structure of a link weight updating block of the second embodiment.

In this case, signals except of the lowest stage signal sign$\Sigma_j$ shown in FIG. 27, i.e., a link weight $w_k$ and zero$\Sigma_j$ of the neuron k, a pulse signal indicative of output data a of the neuron i, a reference pulse T, a teacher signal t, a value $z_k$ of non-linear operation of the neuron k, and a pulse signal zero$\Sigma_k$ from the adding block 130 of the neuron k, are inputted.

They correspond to the link weight $W_{31}$, zero$\Sigma_1$, the pulse signal indicative of a, the reference pulse T, the teacher signal t, the value $z_3$ of non-linear operation and zero$\Sigma_3$ in FIG. 30, respectively.

The link weight $w_{31}$ and the pulse signal zero$\Sigma_1$ are inputted to the A multiplier 161. Accordingly, the data zero$\Sigma_1 \times w_{31}$ is held in the register of the A multiplier 161 at time t13. Thereby, zero$\Sigma_1 \times w_{31}$ is outputted to the B multiplier 161. Then, the pulse signal indicative of a is inputted to the B multiplier 161 and a x zero$\Sigma_1 \times w_{31}$ is held in the register of the B multiplier 161 at time t15. As a result, a×zero$\Sigma_1 \times w_{31}$ is outputted to the E multiplier 162.

Meanwhile, when the value $z_3$ of non-linear operation is calculated by the non-linear operating block 140 based on the pulse signal sign$\Sigma_3$ from the adding block 130 of the neuron k (at time t14), the output of the subtractor 167 becomes t−$z_3$. Then, because zero$\Sigma_3$ is also outputted from the adding block 130 at the same timing with sign$\Sigma_3$, zero$\Sigma_3 \times$(t−$z_3$) is held in the register of the C multiplier 161 at time t15. The value of the register of the C multiplier 161 is converted into a pulse signal in the comparator 164 to be inputted to the E multiplier 162.

Then, the output data of the B multiplier 161 a×zero$\Sigma_1 \times$ $w_{31}$ is multiplied with the output data of the C multiplier 161 zero$\Sigma_3 \times$(t−$z_3$) by the E multiplier 162. Accordingly, data a×zero$\Sigma_1 \times w_{31} \times$zero$\Sigma_3 \times$(t−$z_3$) is held in the register of the E multiplier 162 at time t16. This data is output data $\Delta w_{11}$ of the E multiplier 162 and corresponds to the expression (5). Then, the link weight updating block 160 updates the link weight $w_{11}$ by using this $\Delta w_{11}$.

(2) In case of Neuron k

In this case, a teacher signal t shown at the lower stage of FIG. 27, a value $z_k$ of non-linear operation of the neuron k, a pulse signal zero$\Sigma_k$ from the adding block 130 of the neuron k and a pulse signal sign$\Sigma_j$ from the adding block 130 of the neuron j are inputted.

They correspond to the teacher signal t, the value $z_3$ of non-linear operation, zero$\Sigma_3$, sign$\Sigma_1$ in FIG. 30, respectively.

When the value of non-linear operation $z_3$ is calculated by the non-linear operating block 140 based on the pulse signal sign$\Sigma_3$ from the adding block 130 of the neuron k (at time t14), the output of the subtractor 167 becomes t−$z_3$. Then, because zero$\Sigma_3$ is also outputted from the adding block 130 at the same timing with sign$\Sigma_3$, zero$\Sigma_3 \times$(t−$z_3$) is held in the register of the C multiplier 161 at time t15. The value of the register of the C multiplier 161 is inputted to the D multiplier 161.

Then, sign$\Sigma_1$ is multiplied with the output data of the C multiplier 161 zero$\Sigma_3 \times$(t−$z_3$) by the D multiplier 161. Accordingly, data sign$\Sigma_1 \times$zero$\Sigma_3 \times$(t−$z_3$) is held in the register of the D multiplier 161 at time t16. This data is output data $\Delta w_{31}$ of the D multiplier 161 and corresponds to the expression (4). Then, the link weight updating block 160 updates the link weight $w_{31}$ by using this $\Delta w_{31}$.

It is noted that although the expression (4) has been an expression using the output signal $z_j$ of the neuron j (the pulse train $z_j'$ in terms of the present embodiment), the pulse train $z_j'$ which is the output signal of the neuron j and the pulse train sign$\Sigma_j$ from the adding block 130 of the neuron j may be used in the same manner because they are pulse trains having the identical average delay time. Here, sign$\Sigma_j$ (sign$\Sigma_1$) has been used in the present embodiment by taking the updating timing and the like into consideration.

It is noted that the multiplying block 120 of the present embodiment corresponds to "multiplication corresponding value calculating means", the adding block 130 corresponds to "adding means" and "differential corresponding value calculating means", the non-linear operating block 140 corresponds to "non-linear operating means", the pulse train generating block 150 corresponds to "pulse train generating means" and the link weight updating block 160 corresponds to "value used-in-learning calculating means" and "link weight updating means".

Next, the effects of the neuron 100 of the present embodiment will be explained.

It is needless to say that the same effects with the case of constructing the three-layered hierarchical neural network by using the neurons 10 in the first embodiment may be obtained by constructing it by using the neurons 100 of the present embodiment.

That is, it is possible to obtain the merits that it becomes possible to realize complete parallel processing, to form the circuits relatively easily without being influenced by temperature characteristics and by variations in the processes in forming devices and to improve the reliability. The value of signal to be processed may be also expressed by using the delay time of each pulse. As a result, it is possible to express the excitative coupling and the suppressive coupling by one signal by assuming the delay time as minus. Accordingly, the signal line may be reduced as compared to the prior art arrangement using the pulse density. Specifically, the wiring corresponding to the part connecting the synapse circuit with the nerve circuit in the prior art system is reduced into a half.

Because the neuron 100 of the present embodiment also utilizes the quality that the distribution function of normal distribution becomes a saturated monotonous increment function, the non-linear operating block 140 may be constructed by the counter 141 and the register 142 as shown in FIG. 22. Accordingly, it is also advantageous in that the area of the circuit for the non-linear arithmetic operation may be relatively reduced.

Further, the multiplying block 120 is also constructed without using a multiplier circuit composed of so-called adder circuits by utilizing the approximation of normal distribution of binomial distribution in the neuron 100 of the present embodiment (see FIG. 18). Thereby, it is possible to construct the multiplying block 120 with a circuit area of about 1/11 similarly to the first embodiment. Still more, it is assumed in the present embodiment that each pulse of a pulse train, i.e., an input signal, is generated behind the reference pulse. Accordingly, when the delay time counting section 121 of the present embodiment is compared with the delay time counting section 21 of the multiplying block 20 of the first embodiment, its structure is simplified further.

The A through E multipliers 161 and 162 of the link weight updating block 160 are also constructed without using the multiplier circuit composed of so-called adder circuits by utilizing the approximation of normal distribution of binomial distribution (see FIGS. 28 and 29). Thereby, the circuit area of the link weight updating block 160 is minimized even though it is provided with the five multipliers 161 and 162.

The circuit area of the neuron 100 may be thus reduced considerably by devising the multiplication in the arrangement of the multiplying block 120 and the link weight updating block 160.

The pulse generating block 150 generates the pulse train in which the delay time of each pulse follows the normal distribution to generate a pulse train as an output signal of the neuron 100 by delaying the pulse also in the neuron 100 of the present embodiment. Accordingly, the pulse train having the delay time following the normal distribution may be generated simply.

Further, the pulse generating block 150 generates the pulse train by using the LFSR 151, i.e., the uniform random number generator (see FIG. 25), and by applying the central limit theorem in generating the pulse train in which the delay time of pulse follows the normal distribution. Therefore, the pulse train may be generated by the relatively simple circuit structure.

Although it is necessary to divide the added value by using a dividing circuit or the like when a plurality of uniform random numbers U ($0 \leq U < 1$) are added at this time, the division is executed by adding the random numbers from the four uniform random number generators 151 and by dividing the low order 2 bits of the data of added value as shown in FIG. 25. Accordingly, the circuit area of the neuron 100 may be reduced further also in this point without using the dividing circuit.

The neuron 100 of the present embodiment calculates $\Delta w$ for updating the link weight w by the link weight updating block 160 as shown in FIG. 27 based on the teacher signal t. Therefore, the neuron 100 can learn by itself based on the output signal. Then, the link weight updating block 160 can calculate the both update data $\Delta w_k$ of the link weight $w_k$ of the output layer or the update data $\Delta w_j$ of the link weight $w_j$ of the intermediate layer by the input signals. Accordingly, the neuron 100 may be the structural unit of the output layer or of the intermediate layer. Therefore, it is advantageous in mass-producing the neurons 100.

Although the link weight updating block 160 has been arranged so as to be able to calculate the both update data $\Delta w_k$ of the link weight $w_k$ of the output layer and the update data $\Delta w_j$ of the link weight $w_j$ of the intermediate layer by the input signal in the second embodiment, it may be arranged so as to be able to calculate either one update data $\Delta w$. Although it is disadvantageous more or less in this case from the aspect of mass-production because the neurons in the output layer are separately constructed from the neurons in the intermediate layer, it is effective in the aspect of reducing the circuit area of the neural network.

According to the first and the second embodiments, the operations of the present invention can be summarized as follows.

The present invention represents one signal processed in a neuron by using the delay time of each pulse. As a result, it brings about the following effects.

It is unable to distinguish the excitative coupling from the suppressive coupling in the case of using the pulse density as disclosed in Japanese Patent Laid-Open No. Hei. 7-11524 as described above. Therefore, according to the technology therein, each coupling is divided into the two groups of excitative coupling and suppressive coupling whether the link weight is positive or negative. As a result, a synapse circuit in the publication has been connected with a nerve circuit by two systems of signal lines.

According to the present invention, however, the excitative coupling and the suppressive coupling may be represented by one signal by using the delay time of a pulse and by considering the delay time of the pulse as minus. Accordingly, a number of signal lines may be reduced by composing the hierarchical network by using the inventive neuron as compared to the conventional structure using the pulse density. In particular, wires corresponding to the part for connecting the synapse circuit with the nerve circuit in the conventional system may be reduced into a half.

It is noted that the "delay time" may take a minus value when pulse $s_1^k$ of the pulse train $x_1$ illustrated in FIG. 2 precedes the corresponding reference pulse $T^k$. However, according to the technological concept of the invention, it will do if the "delay time" may be processed as a minus value within the neuron even if the delay time of the pulse train which is a signal between neurons does not take a minus value. That is, when the link weight w is minus, it will do if a multiplication corresponding value with that link weight w may be calculated including a minus value. Accordingly, it is possible to arrange so that the pulse generating means generates a pulse train in which each pulse is behind the reference pulse under the supposition that each pulse of the pulse train inputted from the outside is generated behind the reference pulse.

The same effect with the above-mentioned effect may be obtained also by arranging as described above. That is, the excitative coupling and the suppressive coupling may be represented by one signal and the signal lines may be reduced as compared to the conventional structure using the pulse density. In concrete, the wires corresponding to the part for connecting the synapse circuit with the nerve circuit in the conventional system may be reduced into a half. Then, because each pulse of the pulse train transmitted between the neurons always occurs behind the reference pulse in this case, it is not necessary to consider the case when a pulse is inputted preceding to the reference pulse. As a result, it is advantageous in that the circuit composing the neuron is simplified.

Although means corresponding to the non-linear arithmetic operating means described above may be realized by AND operation of a plurality of pulses when the pulse density is used like the past, it is unable to expect to that from the aspect of accuracy of the arithmetic operation in contrary.

Then, according to the invention, it has been noticed on that a distribution function obtained by integrating the normal distributions becomes a saturated monotonous increment function. By noting on that point, the non-linear arithmetic operating means may be composed of a counter for example as counting means. Accordingly, it is advantageous in that the circuit area corresponding to this non-linear arithmetic operating means may be relatively reduced and the accuracy of the arithmetic operation may be assured.

By the way, it is conceivable to contrive the multiplication corresponding value calculating means described above from the point of view of reducing the circuit area of neuron as much as possible. Although multiplication may be realized by AND operation by using the pulse density, it is unable to expect to the pulse density in terms of its accuracy.

According to the invention, the multiplication corresponding value calculating means obtains the multiplication corresponding value by using the link weight w each corresponding to the pulse train. The distribution of the multiplication corresponding values is a normal distribution of average wx. Accordingly, it is conceivable to compose the multiplication corresponding value calculating means most simply by using multiplying circuits. That is, a value obtained by multiplying the link weight w and each delay time by using the multiplying circuit may be set as the multiplication corresponding value. However, the multiplying circuit has had a disadvantage that its circuit area becomes large in general.

Then, the multiplication corresponding value calculating means may be provided with a uniform random number generator to generate a random number by the uniform random number generator corresponding to the delay time of each pulse, to compare the generated random number with the value of the link weight w and to calculate a multiplication corresponding value based on the result of comparison.

It is what the approximation of normal distribution of binomial distribution is applied. The approximation of normal distribution of binomial distribution is quality that the binomial distribution approaches to the normal distribution of an average value n·P when n is increased in n times of trial following the binomial distribution. Here, P is a probability that the result is "successful" in one time of trial. When P=w and n=x by using this quality, the distribution of probability of "success" in x times of trial follows the normal distribution of average wx.

Accordingly, the multiplication corresponding value following the normal distribution of average wx may be calculated by generating the random number by the uniform random number generator corresponding to the delay time, by counting a number of times when the random number r becomes smaller than the link weight w for example and by calculating the multiplication corresponding value based on the counted value. Thereby, the circuit area of neuron may be reduced considerably as compared to the case of using the multiplying circuit. Then, the accuracy of arithmetic operation may be improved as compared to the case of using the pulse density.

By the way, it is conceivable to construct the pulse train generating means described above by basic pulse generating means and delay means concretely.

The basic pulse generating means generates a pulse train which follows the normal distribution in which the delay time of each pulse is 0 in average. The delay means delays each pulse of the pulse train generated by the basic pulse generating means based on the result of operation of the non-linear arithmetic operating means.

That is, it is possible to generate the pulse train which follows the normal distribution having the average value of delayed time by generating a pulse train which follows the normal distribution of average 0 at first and by delaying each pulse within that pulse train only by certain time. This certain time is time determined from the result of operation of the non-linear arithmetic operating means. It then allows the average of the delay time of each pulse to be arbitrarily set and the pulse train following the normal distribution to be generated simply.

It is noted that the pulse train following the normal distribution in which the average of delay time of each pulse is zeroed may be generated by using the uniform random number generator.

Accordingly, it is conceivable of composing the basic pulse generating means by comprising one or more uniform random number generator, random number adding means for adding random numbers generated by the uniform random number generator and pulse output means for outputting pulses based on the result of addition of the random number adding means.

It has been known that when a large number of random numbers whose distribution is finite is added, it approaches to the normal distribution by the central limit theorem. For instance, a distribution of values obtained by adding 12 uniform random numbers ($0 \leq U < 1$) and by subtracting 6 is a normal distribution of N(0, 1).

In this case, the random number adding means adds random numbers generated by the plurality of uniform random number generators. The result of this addition follows the normal distribution. Therefore, while each pulse is outputted at random if the pulse outputting means outputs the pulses based on this addition result, the delay time is outputted at the timing following the normal distribution as the whole pulse train.

Here, while the plurality of uniform random number generators are used, the value of addition follows the normal distribution accurately in terms of probability by preparing 12 uniform random number generators as described above. However, the reason why the invention is arranged so that the distribution of delay times of each pulse becomes the normal distribution is to enable the non-linear operation as described above. Thereby, the function of the neuron is not damaged even if the delay time does not follow the normal distribution so precisely.

To that end, it is conceivable to construct the basic pulse generating means by using four uniform random number generators. In this case, the uniform random number generator is constructed so as to output data except of two low order bits of added value data obtained by adding the respective random numbers as the addition result.

After adding a plurality of uniform random numbers U ($0 \leq U < 1$), it must be converted into a random number of [0, 1] section by using a dividing circuit and the like. Although it must be divided by "4" when the four uniform random numbers are added as described above, it will do if the two low order bits of the added value data are divided instead of dividing by "4" by using the dividing circuit. Thereby, the circuit area may be also reduced.

By the way, it has been described above that the learning in the neural network may be realized by updating the link weight of each neuron. That is, the learning is to arrange such that a desired output signal z can be obtained from the output layer when the value of link weight w is updated sequentially to an adequate value and a set (input pattern) p of the input signals to the input layer is given.

However, the neuron described above needs not always have the means for realizing the learning by itself. It is because there is a case of calculating and storing the optimum link weight in advance by another computer system or the like and the learning needs not be carried out after assembling to a product or the like.

Meanwhile, when the learning must be carried out after assembling into a product or the like, it is conceivable to construct the above-mentioned neuron by having the means which enables learning. That is, the neuron comprises differential corresponding value computing means, used-in-learning value calculating means and link weight updating means.

At this time, the differential corresponding value computing means counts a number of zeros within the added value obtained by the adding means as a differential corresponding value. As described above as the prior art, the differential value f' of the non-linear function f is required in calculating the degree of update of the link weight. The non-linear arithmetic value counted by the non-linear arithmetic operating means described above has been what the probability density of the normal distribution of average $\Sigma w_i x_i$ is integrated about the part where the added value (computed value of delay time of each pulse) is positive value. Accordingly, f' is the value of the probability density $0$ of the normal distribution of average $\Sigma w_i x_i$. The number of zeros within the added value is counted as the differential corresponding value to that end.

However, not only the case when the added value is truly zero but also the case when the added value is close to zero may be included in the "number of zeros" here to include a calculation error. For instance, the case when the high order bit except of the two low order bits of the added value data is "0" or "1" is detected when the data of added value is represented by the notation of 2's complement. In this case, the added value data in which an absolute value is less than "7" is counted as "0".

The used-in-learning value calculating means calculates a used-in-learning value necessary for learning by using a difference between a signal to be outputted from the neural network and a teacher signal. This used-in-learning value corresponds to $(t_k - z_k)$ in the expression (4) and to $\{\Sigma(t_k - z_k) \cdot f'(y_k) \cdot w_{kj}\}$. Although the value called the used-in-learning value here changes depending on which hierarchy of the neural network the neuron composes, it has been known that it may be generalized based on a fixed rule. Accordingly, it may be calculated by using a predetermined signal.

Then, the link weight updating means updates the link weight w based on the used-in-learning value calculated by the used-in-learning value calculating means, the differential corresponding value counted by the differential corresponding value computing means and a pulse train or a signal corresponding to the pulse train, i.e., an input signal.

In terms of the expression (4), the differential corresponding value corresponds to $f'(y_k)$ and the pulse train corresponds to $z_j'$. In terms of the expression (5), the differential corresponding value corresponds to $f'(y_j)$ and the pulse train corresponds to $z_i$. That is, when a three layered hierarchical neural network is considered for example, the link weight updating means carries out the arithmetic operation corresponding to the expression (4) or (5) and calculates the update amount $\Delta w$ to update the link weight w.

It is noted that not only the pulse train but also the signal corresponding to the pulse train may be used here because the inventive neuron is what notices on the average of the delay times and the signal in which the average of the delay times is the same may be used. For example, a non-linear arithmetic value for generating the pulse train, i.e., the input signal, may be used or another pulse train having the same delay time with the delay time of the pulse train, i.e., the input signal, may be used.

The adoption of such arrangement allows learning based on the teacher signal to be carried out.

The arithmetic operation carried out by the used-in-learning value calculating means and that carried out by the link weight updating means here include multiplication. Accordingly, from the point of view of reducing the circuit area, it is conceivable to construct by using a circuit for finding a multiplied value by applying the approximation of normal distribution of binomial distribution similarly to the multiplication corresponding value calculating means described above.

That is, the used-in-learning value calculating means and the link weight updating means comprise a uniform random number generator to calculate a multiplied value between signals by generating random numbers by the uniform random number generator by only number of times corresponding to one signal and by comparing the generated random number with the other signal. Thereby, the circuit area of the used-in-learning value calculating means and the link weight updating means may be minimized.

In this sense, the multiplying circuit may be considered to be one invention. That is, this multiplying circuit is used to calculate the multiplied value between two signals within the neuron which is modeled after the nerve cell and which is the structural unit of the hierarchical neural network realized as a digital electronic circuit and is characterized in that it comprises the uniform random number generator to calculate the multiplied value based on the result of comparison by generating random numbers by the uniform random number generator by only number of times corresponding to one signal and by comparing the generated random number with the other signal.

While the structure of the neuron has been explained above, it may be realized as an invention of a hierarchical neural network in which the above-mentioned neuron is a functional unit. Then, the learning function by which each neuron updates the link weight w by itself based on a teacher signal may be realized in the hierarchical neural network constructed by using the neuron.

By the way, the used-in-learning value calculated by the used-in-learning value calculating means as described above changes depending on the hierarchy composed of the neurons. Accordingly, in case of the three-layered hierarchical neural network, it is conceivable to construct the neuron of the intermediate layer and the neuron of the output layer differently.

The neuron which is the structural unit of the output layer comprises used-in-learning value calculating means for output layer and the neuron which is the structural unit of the intermediate layer comprises used-in-learning value calculating means for intermediate layer.

In the neuron which is the structural unit of the output layer, the output layer used-in-learning value calculating means calculates the difference between the signal based on the non-linear arithmetic value counted by the non-linear arithmetic operating means and the teacher signal as a used-in-learning value necessary for learning. That is, the output layer used-in-learning value calculating means carries out the arithmetic operation corresponding to $(t_k - z_k)$ in the expression (4). It is described here as "signal based on the non-linear arithmetic value" because the non-linear arithmetic value itself may be used or a pulse signal generated by the pulse generating means based on the non-linear arithmetic value may be used. In this case, the link weight updating means updates the link weight by using the used-in-learning value calculated by the output layer used-in-learning value calculating means.

In the neuron which is the structural unit of the intermediate layer, the intermediate layer used-in-learning value calculating means calculates the difference between a signal to be outputted from the neural network and the teacher signal as a used-in-learning value necessary for learning by using the differential corresponding value outputted from the neuron of the output layer which is the structural unit of the neural network and the link weight. That is, the intermediate layer used-in-learning value calculating means carries out the arithmetic operation corresponding to $\{\Sigma(t_k-z_k)\cdot f'(y_k) \cdot w_{kj}\}$ in the expression (5). Here, the signal to be outputted from the neural network is not limited to be the pulse signal and may be a signal indicative of the value of non-linear operation. In this case, the link weight updating means updates the link weight by using the used-in-learning value calculated by the intermediate layer used-in-learning value calculating means.

Thus, the circuit area of the neuron may be reduced further by constructing the neurons of the intermediate layer and the output layer of the three-layered hierarchical neural network separately because the circuit for calculating the used-in-learning value is individualized. It is noted that although the three-layered hierarchical neural network has been described here, the circuit area of neuron may be reduced by separately constructing the circuit for calculating a used-in-learning value also in a hierarchical neural network of four layers or more.

However, because only the neurons in the intermediate layer and the output layer exist in the three-layered hierarchical neural network, it is also conceivable to facilitate the mass-production of the neurons by commonly using the circuits for calculating the used-in-learning values.

According to another aspect of the present invention, the structure of the neuron, which may become the structural unit of either output layer or intermediate layer in the three-layered hierarchical neural network realized as a digital electronic circuit, is constructed as follows.

That is, the used-in-learning value calculating means calculates the difference between the signal based on the non-linear arithmetic value counted by the non-linear arithmetic operating means and the teacher signal as a used-in-learning value necessary for learning when the neuron becomes the structural unit of the output layer. Meanwhile, when the neuron becomes the structural unit of the intermediate layer, it calculates the used-in-learning value necessary for learning by using the difference between the signal to be outputted from the neural network and the teacher signal, the differential corresponding value outputted from the neuron of the output layer which is the structural unit of the neural network and the link weight.

Thereby, the structure of the neurons of the intermediate layer and the output layer may be commonly used and the neurons may be mass-produced readily.

While the preferred embodiments have been described, variations thereto will occur to those skilled in the art within the scope of the present inventive concepts which are delineated by the following claims.

What is claimed is:

1. A neuron modeled after a nerve cell which is a structural unit of a hierarchical neural network realized as a digital electronic circuit, comprising:

multiplication corresponding value calculating means for, when a pulse train which is composed of a predetermined number of pulses and in which delay time of each pulse from a corresponding reference pulse follows a normal distribution of average x is inputted as an input signal, calculating a multiplication corresponding value following a normal distribution of average wx by using a link weight w corresponding respectively to said pulse train;

adding means for adding the multiplication corresponding values calculated with respect to each of said pulse train by using said multiplication corresponding value calculating means;

non-linear operating means for counting a number of positive values within the added value by said adding means as a value of non-linear operation; and pulse train generating means for generating a pulse train composed of a predetermined number of pulses, wherein said delay time of each pulse from a corresponding reference pulse follows a normal distribution whose average value corresponds to a delay time, which is decided based on said value of non-linear operation counted by said non-linear operating means.

2. The neuron according to claim 1, further comprising reference pulse generating means for generating said reference pulse.

3. The neuron according to claim 1, wherein said multiplication corresponding value calculating means comprises a uniform random number generator and is constructed so as to generate random numbers by said uniform random number generator for a number of times corresponding to the delay time of each pulse, to compare said generated random number with the value of link weight w to calculate said multiplication corresponding value based on the result of comparison.

4. The neuron according to claim 1, wherein said pulse train generating means comprises:

basic pulse generating means for generating a pulse train, in which said delay time of each pulse from a corresponding reference pulse follows a normal distribution whose average is 0; and delaying means for delaying each pulse of the pulse train generated by said basic pulse generating means based on said value of non-linear operation obtained by said non-linear operating means.

5. The neuron according to claim 4, wherein said basic pulse generating means comprises:

one or more uniform random number generators;

random number adding means for adding random numbers generated by said uniform random number generators; and pulse outputting means for outputting pulses based on a result of addition of said random numbers by said random number adding means.

6. The neuron according to claim 5, wherein:

said basic pulse generating means comprises four uniform random number generators; and said random number adding means outputs data excluding low order 2 bits of data of an added value as the result of addition.

7. The neuron according to claim 1, wherein:

each pulse of said inputted pulse train occurs behind said reference pulse; and said pulse train generating means generates said pulse train in which each pulse is delayed from said reference pulse.

8. The neuron according to claim 1, further comprising:
differential corresponding value operating means for counting a number of zeros within the added value obtained by said adding means as a differential corresponding value;
value used-in-learning value calculating means for calculating a value used-in-learning necessary for learning by using a difference between a signal which is an output of said neural network and a teacher signal; and
link weight updating means for updating said link weight w based on said value used-in-learning calculated by said value used-in-learning calculating means, said differential corresponding value counted by said differential corresponding value operating means and the pulse train which is the input signal or a signal corresponding to said pulse train.

9. The neuron according to claim 8, wherein said value used-in-learning calculating means and said link weight updating means comprise uniform random number generators for generating random numbers by a number of times corresponding to one signal, and calculate a multiplied value between signals by comparing the generated random number with the other signal.

10. A neuron modeled after a nerve cell which is a structural unit of an output layer of a three-layered hierarchical neural network realized as a digital electronic circuit, comprising:
multiplication corresponding value calculating means for, when a pulse train which is composed of a predetermined number of pulses and in which delay time of each pulse from a corresponding reference pulse follows a normal distribution of average x is inputted as an input signal, calculating a multiplication corresponding value following a normal distribution of average wx by using a link weight w corresponding respectively to said pulse train;
adding means for adding the multiplication corresponding values calculated with respect to each of said pulse train by using said multiplication corresponding value calculating means;
non-linear operating means for counting a number of positive values within the added value by said adding means as a value of non-linear operation;
pulse train generating means for generating a pulse train composed of a predetermined number of pulses, wherein said delay time of each pulse from a corresponding reference pulse follows a normal distribution whose average value corresponds to a delay time, which is decided based on said value of non-linear operation counted by said non-linear operating means;
differential corresponding value operating means for counting a number of zeros within the added value obtained by said adding means as a differential corresponding value;
output layer value used-in-learning calculating means for calculating a difference between a signal which is based on the value of non-linear operation counted by said non-linear operating means and a teacher signal as a value used-in-learning necessary for learning; and
link weight updating means for updating said link weight w based on said value used-in-learning calculated by said output layer value used-in-learning calculating means, said differential corresponding value counted by said differential corresponding value operating means and the pulse train which is the input signal or a signal corresponding to said pulse train.

11. A neuron modeled after a nerve cell which is a structural unit of an intermediate layer of a three-layered hierarchical neural network realized as a digital electronic circuit, comprising:
multiplication corresponding value calculating means for, when a pulse train which is composed of a predetermined number of pulses and in which delay time of each pulse from a corresponding reference pulse follows a normal distribution of average x is inputted as an input signal, calculating a multiplication corresponding value following a normal distribution of average wx by using a link weight w corresponding respectively to said pulse train;
adding means for adding the multiplication corresponding values calculated with respect to each of said pulse train by using said multiplication corresponding value calculating means;
non-linear operating means for counting a number of positive values within the added value by said adding means as a value of non-linear operation;
pulse train generating means for generating a pulse train composed of a predetermined number of pulses, wherein said delay time of each pulse from a corresponding reference pulse follows a normal distribution whose average value corresponds to a delay time, which is decided based on said value of non-linear operation counted by said non-linear operating means;
differential corresponding value operating means for counting a number of zeros within the added value obtained by said adding means as a differential corresponding value;
intermediate layer value used-in-learning calculating means for calculating value used-in-learning necessary for learning by using a difference between a signal which is an output of said neural network and a teacher signal, the differential corresponding value outputted from a neuron in an output layer which is the structural unit of said neural network and the link weight; and
link weight updating means for updating said link weight w based on said value used-in-learning calculated by said intermediate layer value used-in-learning calculating means, said differential corresponding value counted by said differential corresponding value operating means and the pulse train which is the input signal or a signal corresponding to said pulse train.

12. A neuron modeled after a nerve cell which is a structural unit of one of an intermediate layer and an output layer of a three-layered hierarchical neural network realized as a digital electronic circuit, comprising:
multiplication corresponding value calculating means for, when a pulse train which is composed of a predetermined number of pulses and in which delay time of each pulse from a corresponding reference pulse follows a normal distribution of average x is inputted as an input signal, calculating a multiplication corresponding value following a normal distribution of average wx by using a link weight w corresponding respectively to said pulse train;
adding means for adding the multiplication corresponding values calculated with respect to each of said pulse train by using said multiplication corresponding value calculating means;
non-linear operating means for counting a number of positive values within the added value by said adding means as a value of non-linear operation;

pulse train generating means for generating a pulse train composed of a predetermined number of pulses, wherein said delay time of each pulse from a corresponding reference pulse follows a normal distribution whose average value corresponds to a delay time, which is decided based on said value of non-linear operation counted by said non-linear operating means;

differential corresponding value operating means for counting a number of zeros within the added value obtained by said adding means as a differential corresponding value;

value used-in-learning value calculating means for calculating a difference between a signal based on the value of non-linear operation counted by said non-linear operating means and a teacher signal as a value used-in-learning necessary for learning when said neuron is the structural unit of an output layer and for calculating a value used-in-learning necessary for learning by using the difference between a signal which is an output of said neural network and the teacher signal, the differential corresponding value outputted from the neuron of said output layer which is the structural unit of said neural network and the link weight when said neuron is the structural unit of the intermediate layer; and link weight updating means for updating said link weight w based on said value used-in-learning calculated by said value used-in-learning calculating means, said differential corresponding value counted by said differential corresponding value operating means and the pulse train which is the input signal or a signal corresponding to said pulse train.

13. A hierarchical neural network having a neuron as its functional unit, comprising:

a neuron modeled after a nerve cell which is a structural unit of a hierarchical neural network realized as a digital electronic circuit, including:

multiplication corresponding value calculating means for, when a pulse train which is composed of a predetermined number of pulses and in which delay time of each pulse from a corresponding reference pulse follows a normal distribution of average x is inputted as an input signal, calculating a multiplication corresponding value following a normal distribution of average wx by using a link weight w corresponding respectively to said pulse train;

adding means for adding the multiplication corresponding values calculated with respect to each of said pulse train by using said multiplication corresponding value calculating means;

non-linear operating means for counting a number of positive values within the added value by said adding means as a value of non-linear operation; and pulse train generating means for generating a pulse train composed of apredetermined number of pulses, wherein said delay time of each pulse from a corresponding reference pulse follows a normal distribution whose average value corresponds to a delay time, which is decided based on said value of non-linear operation counted by said non-linear operating means.

14. A multiplier circuit for calculating a multiplied value of two signals within a neuron of a digitally realized hierarchical neural network comprising:

clock generating means for generating clock signals corresponding to an input signal;

uniform random number generating means for generating a number of random numbers corresponding to a number of said clock signals;

comparing means for comparing said random numbers with another signal and for generating predetermined output signals; and counting means for counting a number of the predetermined output signals output by said comparing means and for outputting multiplication results as a numeric value.

15. A multiplier circuit for calculating a multiplied value of two signals within a neuron of a digitally realized hierarchical neural network comprising:

a clock input for receiving externally generated clock signals;

a shift register in communication with the clock input for generating a number of random numbers corresponding to a number of the clock signals;

a comparator connected to the shift register for comparing the random numbers with link weight based signals and for outputting pulses based on a relationship between the random numbers and the link weight based signals; and an up-down counter switchably connected to the comparator, the up-down counter for counting the number of pulses output from the comparator and for subsequently outputting multiplication results as a numeric value.

* * * * *